United States Patent
Harada et al.

(10) Patent No.: US 9,756,242 B2
(45) Date of Patent: Sep. 5, 2017

(54) COMMUNICATION TERMINAL, DISPLAY METHOD, AND COMPUTER PROGRAM PRODUCT

(71) Applicants: Toru Harada, Kanagawa (JP); Hiroyuki Satoh, Kanagawa (JP); Noriyuki Terao, Miyagi (JP); Yoshiaki Irino, Kanagawa (JP); Tomonori Tanaka, Kanagawa (JP); Nozomi Imae, Kanagawa (JP); Hirokazu Takenaka, Kanagawa (JP); Hideaki Yamamoto, Kanagawa (JP); Kensuke Masuda, Kanagawa (JP); Satoshi Sawaguchi, Kanagawa (JP); Satoshi Taneichi, Tokyo (JP); Masanori Watanabe, Tokyo (JP); Takeshi Ito, Tokyo (JP)

(72) Inventors: Toru Harada, Kanagawa (JP); Hiroyuki Satoh, Kanagawa (JP); Noriyuki Terao, Miyagi (JP); Yoshiaki Irino, Kanagawa (JP); Tomonori Tanaka, Kanagawa (JP); Nozomi Imae, Kanagawa (JP); Hirokazu Takenaka, Kanagawa (JP); Hideaki Yamamoto, Kanagawa (JP); Kensuke Masuda, Kanagawa (JP); Satoshi Sawaguchi, Kanagawa (JP); Satoshi Taneichi, Tokyo (JP); Masanori Watanabe, Tokyo (JP); Takeshi Ito, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 247 days.

(21) Appl. No.: 13/902,124

(22) Filed: May 24, 2013

(65) Prior Publication Data
US 2013/0326419 A1    Dec. 5, 2013

(30) Foreign Application Priority Data

May 31, 2012  (JP) .................................. 2012-124567
Mar. 15, 2013  (JP) .................................. 2013-053565

(51) Int. Cl.
*H04N 5/232* (2006.01)
*G06F 17/30* (2006.01)
*G06F 3/0481* (2013.01)

(52) U.S. Cl.
CPC ..... *H04N 5/23238* (2013.01); *G06F 3/04817* (2013.01); *G06F 17/30274* (2013.01)

(58) Field of Classification Search
CPC .................................................. H04N 5/23238
See application file for complete search history.

(56) References Cited

U.S. PATENT DOCUMENTS 6,507,358 B1 * 1/2003 Mori et al. ...................... 348/42
6,593,938 B1 * 7/2003 Sakata et al. ................. 345/629
(Continued)

FOREIGN PATENT DOCUMENTS

| CN | 101102489 A | 1/2008 |
|---|---|---|
| CN | 101957495 A | 1/2011 |

(Continued)

OTHER PUBLICATIONS

Balabanović, Marko, Lonny L. Chu, and Gregory J. Wolff. "Storytelling with digital photographs." Proceedings of the SIGCHI conference on Human Factors in Computing Systems. ACM, 2000.*

(Continued)

*Primary Examiner* — William Bashore
*Assistant Examiner* — Nathan Shrewsbury
(74) *Attorney, Agent, or Firm* — Oblon, McClelland, Maier & Neustadt, L.L.P.

(57) ABSTRACT

A communication terminal displays thumbnails for predetermined-region images in a panoramic image and accepts a
(Continued)

selection of a predetermined thumbnail so as to display the predetermined-region image corresponding to the accepted thumbnail. This brings about an effect that a user can easily find a desired panoramic image or a desired predetermined-region image in the panoramic image.

8 Claims, 34 Drawing Sheets

(56) References Cited

U.S. PATENT DOCUMENTS

| | | | |
|---|---|---|---|
| 6,674,881 B2* | 1/2004 | Bacus et al. | 382/128 |
| 6,775,402 B2* | 8/2004 | Bacus et al. | 382/133 |
| 8,599,219 B2* | 12/2013 | Shechtman et al. | 345/635 |
| 8,619,098 B2* | 12/2013 | Shechtman et al. | 345/635 |
| 8,670,046 B2* | 3/2014 | Ohba et al. | 348/231.3 |
| 8,839,152 B2 | 9/2014 | Ohkubo et al. | |
| 2001/0005433 A1* | 6/2001 | Takiguchi | 382/299 |
| 2002/0063725 A1* | 5/2002 | Tarbutton | G06T 11/60 345/629 |
| 2006/0156254 A1* | 7/2006 | Satake | 715/838 |
| 2007/0071361 A1* | 3/2007 | Sanno | 382/298 |
| 2008/0022230 A1 | 1/2008 | Ogawa et al. | |
| 2008/0247636 A1* | 10/2008 | Davis | G06T 19/00 382/152 |
| 2009/0160996 A1* | 6/2009 | Yamaoka | G06T 5/006 348/333.11 |
| 2010/0002070 A1* | 1/2010 | Ahiska | G08B 13/19691 348/36 |
| 2010/0002071 A1* | 1/2010 | Ahiska | 348/36 |
| 2010/0122208 A1* | 5/2010 | Herr | G06F 3/04845 715/799 |
| 2010/0182501 A1* | 7/2010 | Sato et al. | 348/441 |
| 2011/0055766 A1 | 3/2011 | Ogawa et al. | |
| 2011/0110605 A1* | 5/2011 | Cheong | H04N 5/23238 382/284 |
| 2011/0221912 A1* | 9/2011 | Yoshizawa | H04N 1/00241 348/207.99 |
| 2012/0019614 A1* | 1/2012 | Murray | H04N 13/0007 348/36 |
| 2012/0062695 A1 | 3/2012 | Sakaki | |
| 2012/0069131 A1* | 3/2012 | Abelow | G06Q 10/067 348/14.01 |
| 2012/0200665 A1* | 8/2012 | Furumura | G06T 3/0062 348/36 |
| 2012/0314049 A1* | 12/2012 | Gu | G06F 19/321 348/79 |
| 2013/0235084 A1* | 9/2013 | Wu et al. | 345/660 |

FOREIGN PATENT DOCUMENTS

| | | |
|---|---|---|
| CN | 102393841 A | 3/2012 |
| CN | 102461153 A | 5/2012 |
| JP | 2005-136599 | 5/2005 |
| JP | 4258825 | 2/2009 |
| JP | 4307483 | 5/2009 |
| JP | 2011-053926 | 3/2011 |
| JP | 2011-059775 | 3/2011 |
| JP | 2011-076249 | 4/2011 |

OTHER PUBLICATIONS

Pea, Roy, et al. "The diver project: Interactive digital video repurposing." MultiMedia, IEEE 11.1 (2004): 54-61.*
Extended European Search Report issued on May 11, 2015 in Patent Application No. 13169681.7.
Office Action mailed Feb. 29, 2016, in Chinese Patent Application No. 201310210163.8 (with English-language translation).
Office Action mailed Dec. 6, 2016, in Japanese Patent Application No. 2013-053565.

* cited by examiner

FIG.2
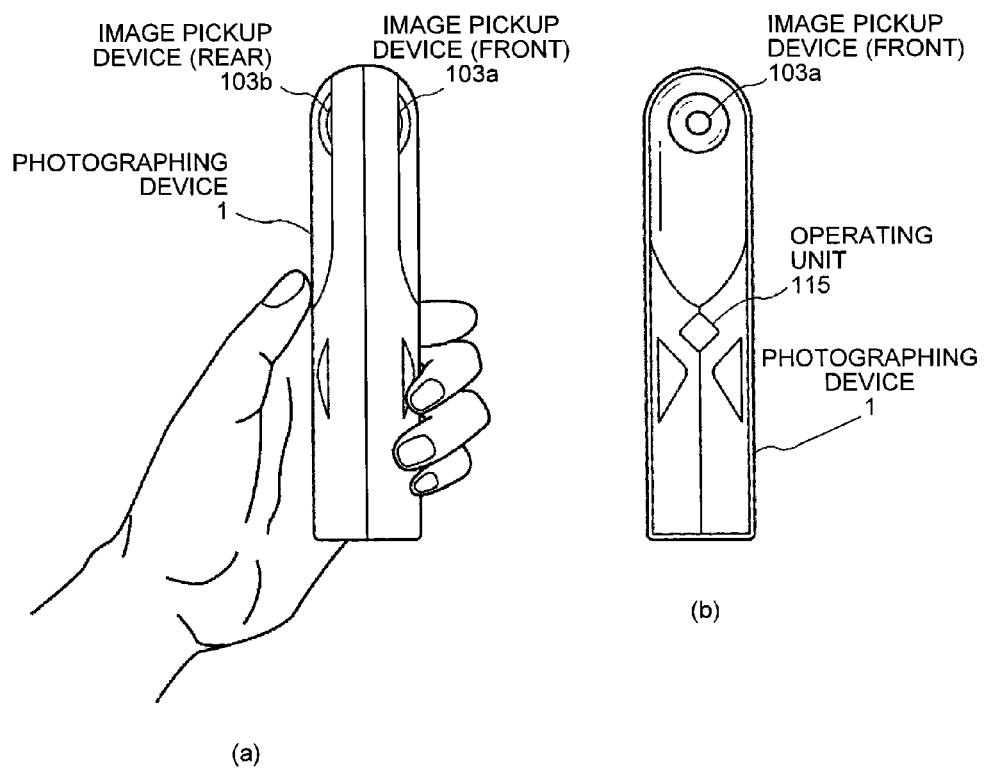
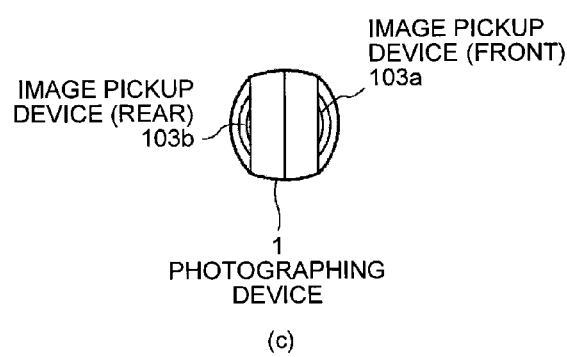

FIG.4
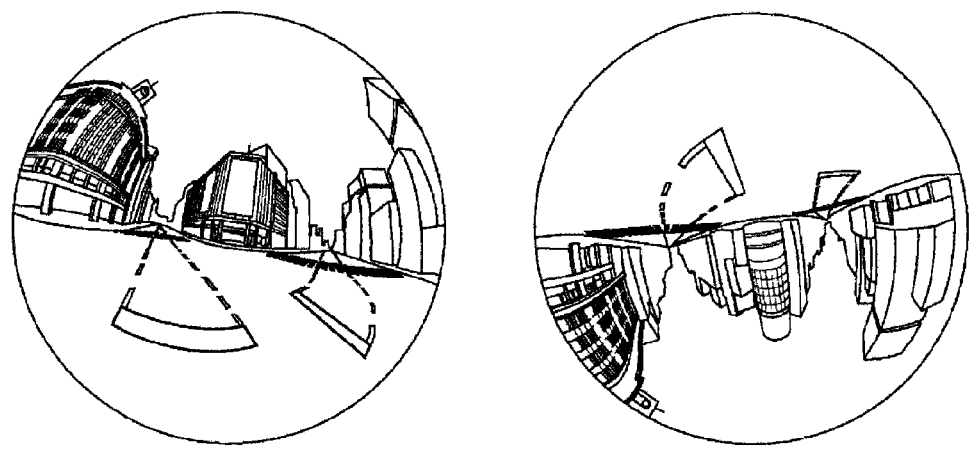
HEMISPHERICAL IMAGE
(FRONT)
(a)
HEMISPHERICAL IMAGE
(REAR)
(b)
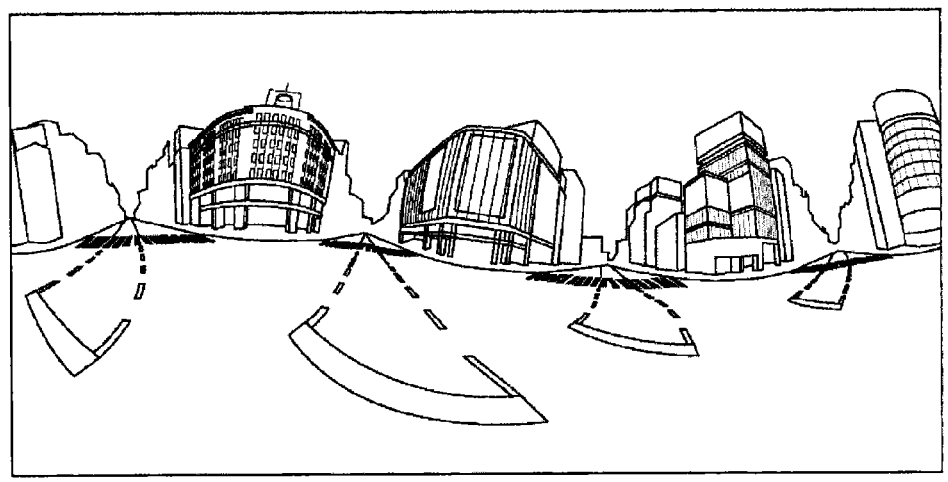
PHOTOGRAPHED IMAGE
(MERCATOR IMAGE)
(c)

FIG.5
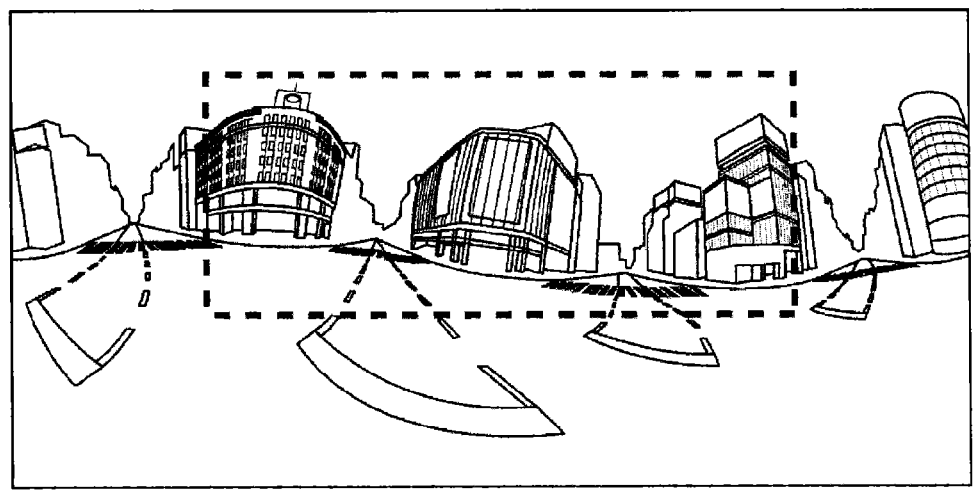
PHOTOGRAPHED IMAGE
(MERCATOR IMAGE)
(a)
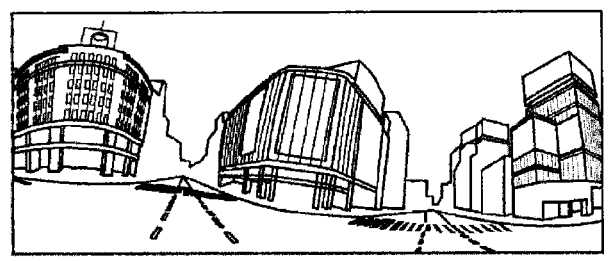
SELECTION IMAGE
(b)

FULL SPHERICAL
PANORAMIC IMAGE

FIG.8
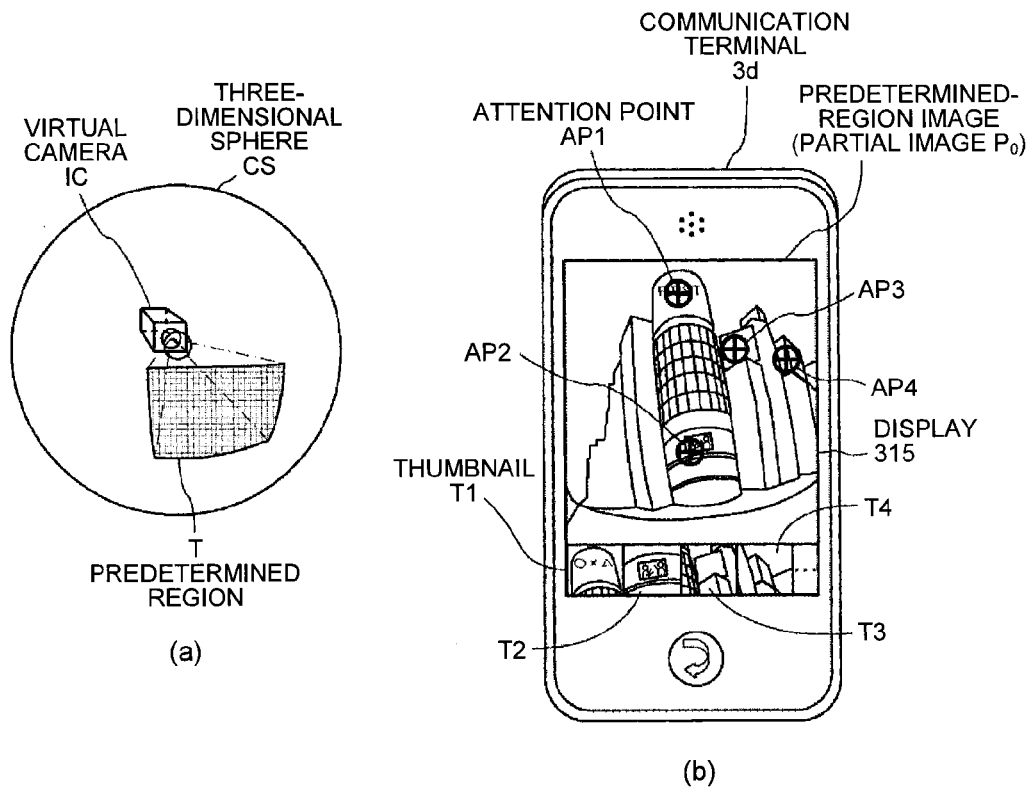
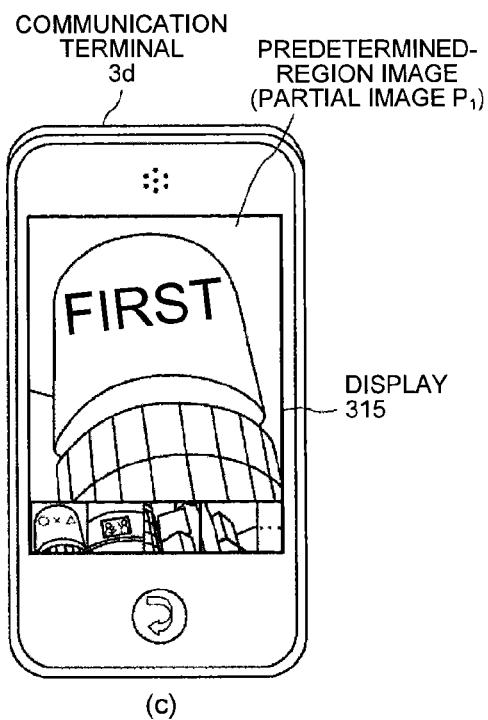

FIG.14

| THUMBNAIL ID | IMAGE ID | COORDINATE x | COORDINATE y | ANGLE OF VIEW | SPECIFICATION DATE | SPECIFYING USER'S NAME | SCENE |
|---|---|---|---|---|---|---|---|
| th0001 | au1415ifauy | 128 | 96 | 60 | 2011.02.03 | Bob | Landscape |
| th0002 | au1415ifauy | 258 | 20 | 60 | 2011.02.04 | Kelly | Figure |
| ... | ... | ... | ... | ... | ... | ... | ... |

- THUMBNAIL IDENTIFICATION INFORMATION: THUMBNAIL ID
- IMAGE IDENTIFICATION INFORMATION: IMAGE ID
- PREDETERMINED-REGION INFORMATION: COORDINATE x, COORDINATE y, ANGLE OF VIEW
- RELATED INFORMATION: SPECIFICATION DATE, SPECIFYING USER'S NAME, SCENE
- PREDETERMINED-REGION MANAGEMENT INFORMATION

FIG.15

IMAGE MANAGEMENT INFORMATION

IMAGE IDENTIFICATION INFORMATION

AUXILIARY INFORMATION

| IMAGE ID | DISCLOSURE | IMAGE DATA SIZE | SHOOTING DATE/ TIME | NUMBER OF ATTENTION POINTS |
|---|---|---|---|---|
| au1414ifauy | ○ | 11.1 | 2011.09.20.12:30:31 | 20 |
| au1415ifauy | ○ | 13.1 | 2011.09.20.17:21:30 | 35 |
| au1417ifauy | ○ | 11.5 | 2011.09.20.18:30:22 | 3 |
| ⋮ | ⋮ | ⋮ | ⋮ | ⋮ |
| 209ahgbiaw | × | 12.6 | 2012.12.12.03:06:00 | 8 |

FIG.16

| THUMBNAIL IDENTIFICATION INFORMATION | IMAGE IDENTIFICATION INFORMATION | PREDETERMINED-REGION INFORMATION | | | | RELATED INFORMATION | | | |
|---|---|---|---|---|---|---|---|---|---|
| THUMBNAIL ID | IMAGE ID | COORDINATE x | COORDINATE y | ANGLE OF VIEW | | SPECIFICATION DATE | SPECIFYING USER'S NAME | SCENE | |
| ... | ... | ... | ... | ... | | ... | ... | ... | |
| th0001 | au1415ifauy | 128 | 96 | 60 | | 2011.02.03 | Bob | Landscape | |
| th0002 | au1415ifauy | 258 | 20 | 60 | | 2011.02.04 | Kelly | Figure | |
| ... | ... | ... | ... | ... | | ... | ... | ... | |
| th0100 | 209ahgbiaw | 1500 | 120 | 30 | | 2011.12.12 | Risa | Structure | |

{ PREDETERMINED-REGION MANAGEMENT INFORMATION }

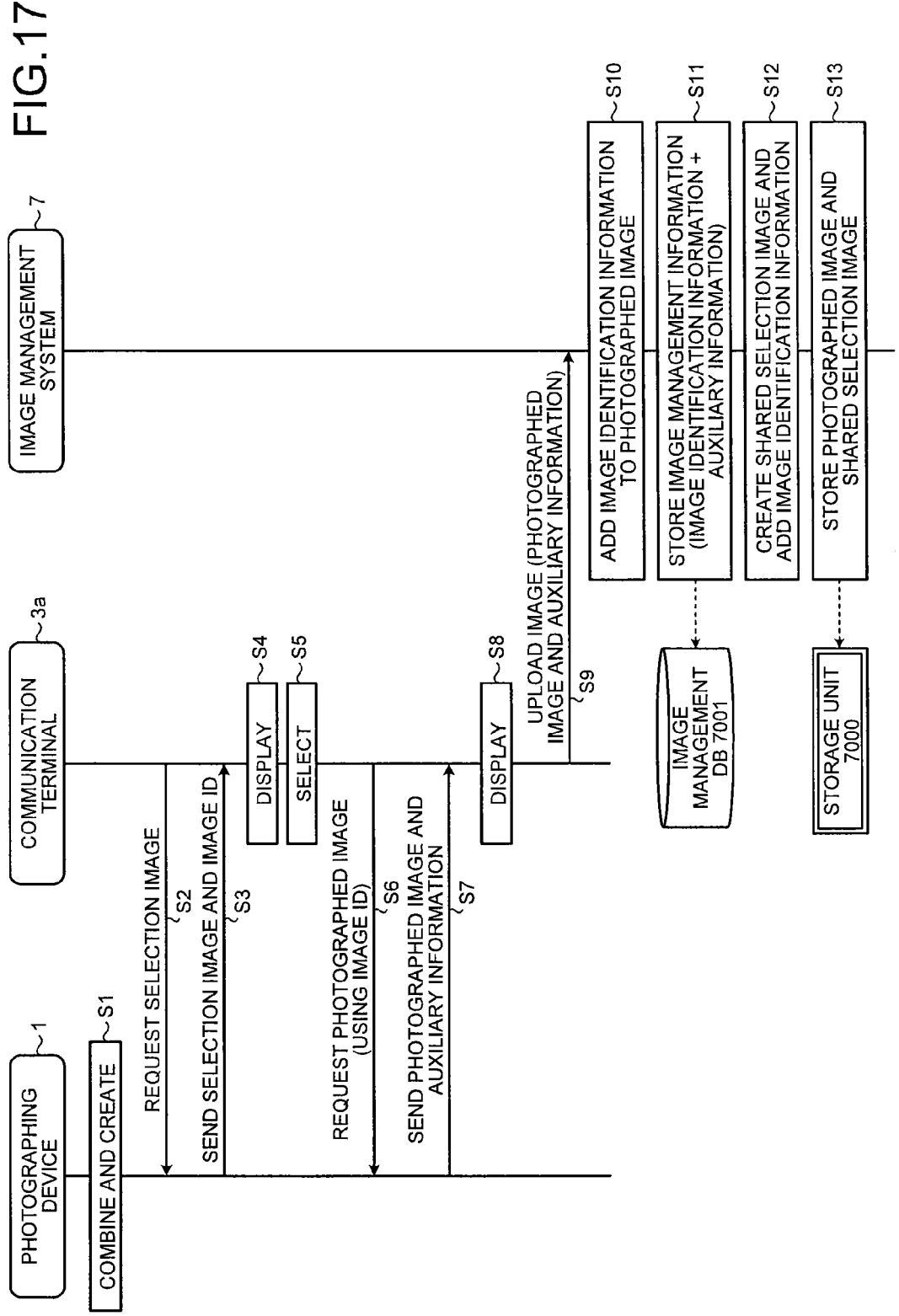

FIG.19
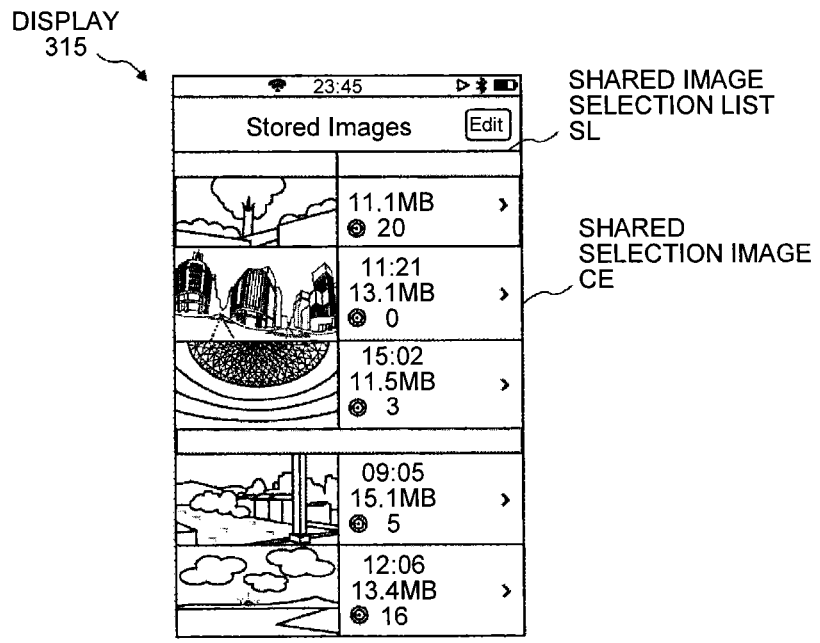
(a)
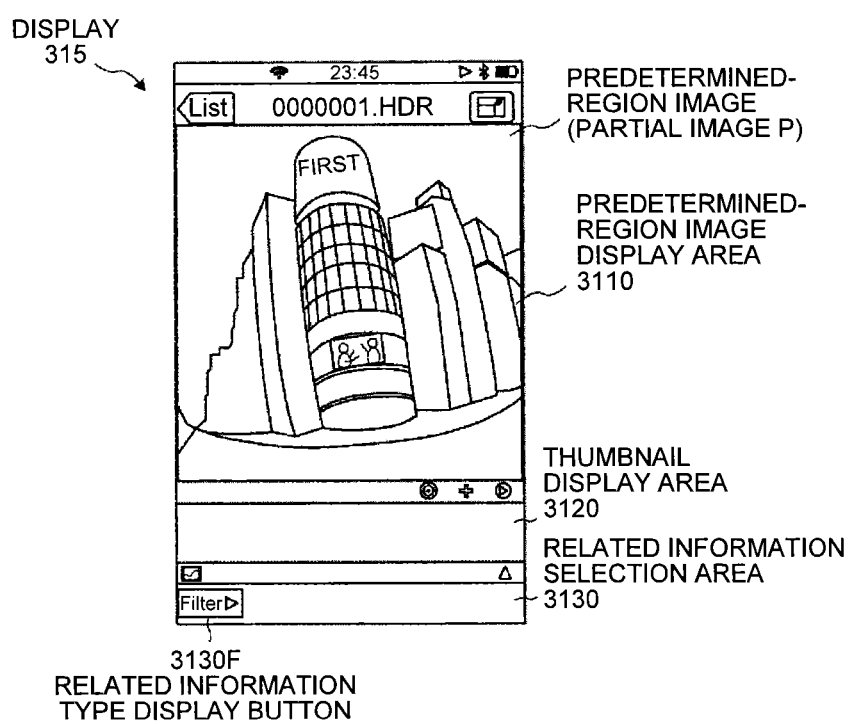
(b)

FIG.23
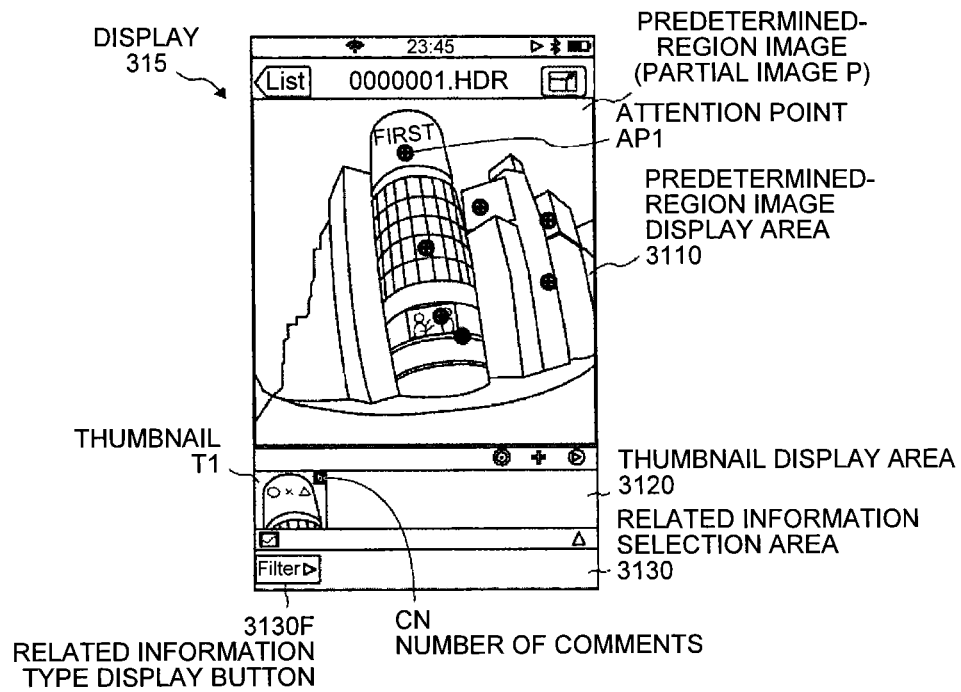
(a)
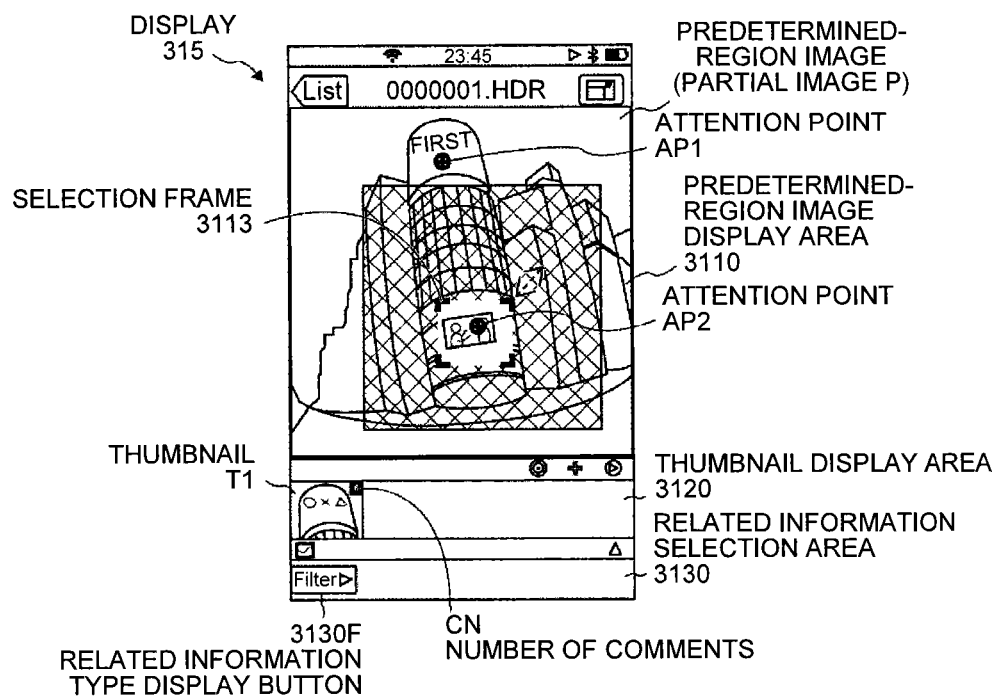
(b)

COMMUNICATION TERMINAL, DISPLAY METHOD, AND COMPUTER PROGRAM PRODUCT

CROSS-REFERENCE TO RELATED APPLICATIONS

The present application claims priority to and incorporates by reference the entire contents of Japanese Patent Application No. 2012-124567 filed in Japan on May 31, 2012 and Japanese Patent Application No. 2013-053565 filed in Japan on Mar. 15, 2013.

BACKGROUND OF THE INVENTION

1. Field of the Invention

The present invention relates to an invention of displaying a predetermined-region image in a panoramic image.

2. Description of the Related Art

In recent years, occasions have increased in which an Internet user uploads an image taken with a digital camera or the like to a server computer on the Internet while another user downloads the image, and thus, a plurality of users share the same image. Some digital cameras can take full spherical panoramic images, which are also uploaded and shared with other users (refer to Japanese Patent Application Laid-open No. 2011-076249).

A panoramic image, such as a full spherical panoramic image, looks curved to a user when the image is downloaded and displayed as it is on a display by the user. The user, therefore, displays an image of a predetermined region that is a part of the full spherical panoramic image on the display and browses the image.

Thus, the image displayed on the display is a part of the panoramic image. As more panoramic images are downloaded, the user finds it more difficult to find out which panoramic image is being browsed, or which predetermined region in which panoramic image the image being browsed belongs to. As a result, a problem occurs in that the user cannot easily find a desired panoramic image or an image of a desired predetermined region in the panoramic image.

SUMMARY OF THE INVENTION

It is an object of the present invention to at least partially solve the problems in the conventional technology.

According to the present invention, there is provided: a communication terminal comprising: a storage unit configured to store therein predetermined-region information for indicating predetermined regions in a panoramic image and thumbnail identification information for identifying thumbnails for the predetermined-region images indicated by the predetermined-region information, in a manner corresponding to each other; a display control unit configured to control a predetermined display unit to display the thumbnails; and an accepting unit configured to accept a selection of a predetermined thumbnail out of the displayed thumbnails; wherein the display control unit controls, based on the thumbnail identification information of the selected thumbnail, the display unit to display the predetermined-region image indicated by the predetermined-region information corresponding to the thumbnail identification information.

The invention also provides a display method for displaying an image using a communication terminal comprising a storage unit that stores therein image identification information for identifying a panoramic image, predetermined-region information for specifying a predetermined region in the panoramic image, and related information related to the predetermined region, in a manner corresponding to each other, the display method comprising, by the communication terminal: accepting a selection of predetermined related information; searching the storage unit based on the predetermined related information accepted at the accepting so as to extract the image identification information and the predetermined-region information corresponding to the predetermined related information; and controlling a predetermined display unit to display thumbnails for predetermined-region images specified in the extracted predetermined-region information, in the panoramic image identified by the extracted image identification information.

In the above-mentioned display method, the accepting includes accepting a selection of a predetermined thumbnail out of the displayed thumbnails, and the controlling includes controlling the display unit to display the predetermined-region image indicated by the predetermined-region information corresponding to the selected thumbnail.

The invention also provides a computer program product comprising a non-transitory computer-readable medium containing a computer program that causes a computer to function as a communication terminal comprising a storage unit that stores therein image identification information for identifying a panoramic image, predetermined-region information for specifying a predetermined region in the panoramic image, and related information related to the predetermined region, in a manner corresponding to each other, the functions comprising: accepting a selection of predetermined related information; searching the storage unit based on the predetermined related information accepted at the accepting so as to extract the image identification information and the predetermined-region information corresponding to the predetermined related information; and controlling a predetermined display unit to display thumbnails for predetermined-region images specified in the extracted predetermined-region information, in the panoramic image identified by the extracted image identification information; wherein the accepting includes accepting a selection of a predetermined thumbnail out of the displayed thumbnails; and the controlling includes controlling the display unit to display the predetermined-region image indicated by the predetermined-region information corresponding to the selected thumbnail.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2(a) is a left side view of a photographing device; FIG. 2 (b) is a front view of the photographing device; and FIG. 2 (c) is a plan view of the photographing device;

FIG. 4(a) is a diagram illustrating a hemispherical image (front) taken with the photographing device; FIG. 4 (b) is a diagram illustrating a hemispherical image (rear) taken with the photographing device; and FIG. 4(c) is a diagram illustrating an image represented by Mercator projection;

FIG. 5(a) is a diagram illustrating the image represented by the Mercator projection and a portion of a selection image, and FIG. 5(b) is a diagram illustrating the selection image;

FIG. 8(a) is a three-dimensional perspective view of FIG. 7, and FIG. 8(b) and FIG. 8(c) are diagrams illustrating a communication terminal displaying, on a display thereof, images in the predetermined region;

FIG. 14 is a conceptual diagram illustrating a predetermined-region management table;

FIG. 15 is a conceptual diagram illustrating an image management table;

FIG. 16 is a conceptual diagram illustrating a predetermined-region management table;

FIG. 17 is a sequence diagram illustrating a process of uploading a photographed image;

FIG. 19(a) is a diagram of a photographed image selection list indicating shared selection images, and FIG. 19(b) is a diagram illustrating a predetermined-region image;

FIG. 23(a) and FIG. 23(b) are screen examples illustrating the setting process of the predetermined region;

DETAILED DESCRIPTION OF THE PREFERRED EMBODIMENTS

Embodiments of the present invention will be described below using FIGS. 1 to 39.

First Embodiment

A first embodiment of the present invention will be described below using FIGS. 1 to 34.

Outline of Embodiment

Figure 1:
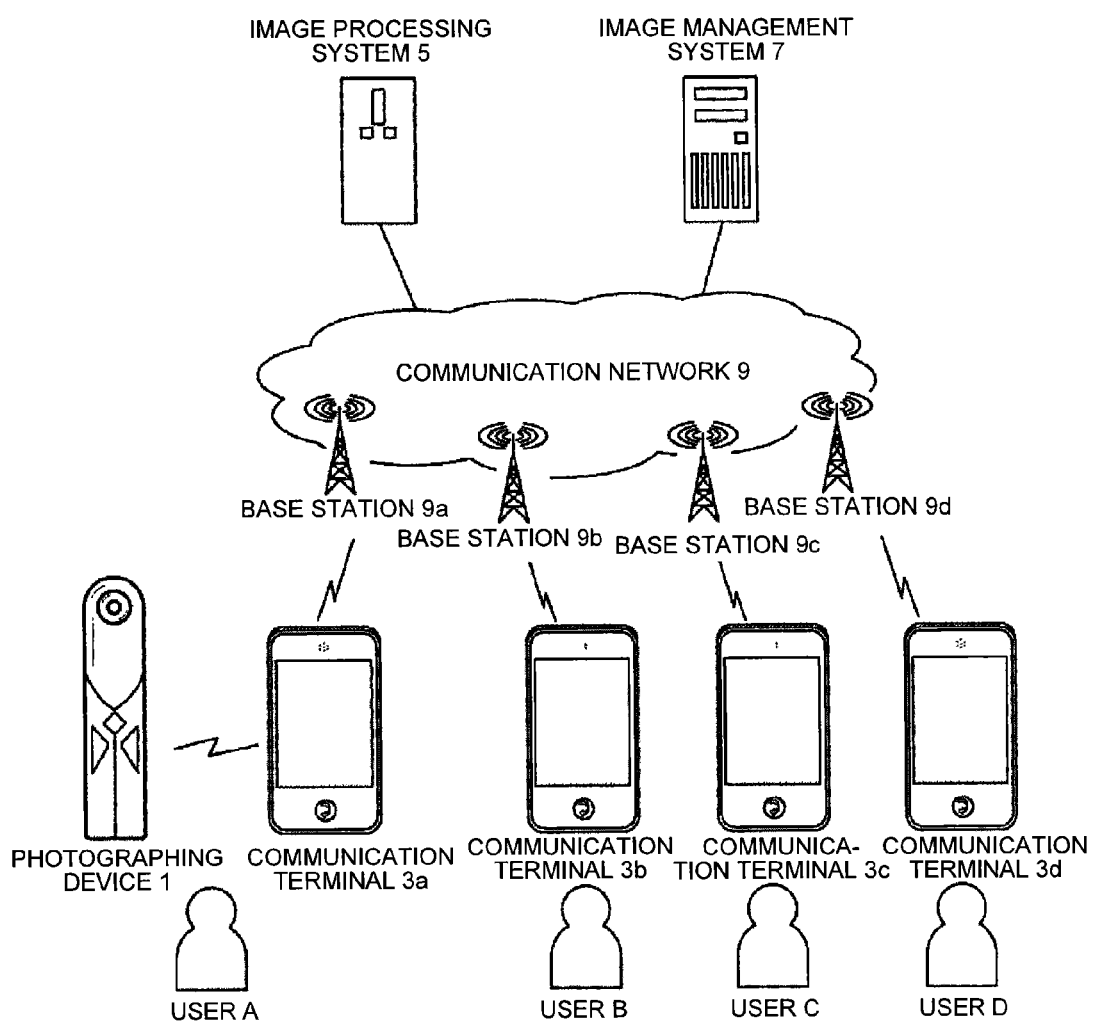
FIG. 1 is a schematic diagram of an image sharing system according to a first embodiment of the present invention.

An outline of the present embodiment will first be described using FIGS. 1 to 8. FIG. 1 is a schematic diagram of an image sharing system according to one of the embodiments of the present invention.

As illustrated in FIG. 1, the image sharing system of the present embodiment is built up with a photographing device 1, a plurality of communication terminals 3a, 3b, 3c, and 3d, an image processing system 5, and an image management system 7. The communication terminals 3a, 3b, 3c, and 3d are used by users A, B, C, and D, respectively. The present embodiment illustrates a case in which the user A operates the photographing device 1. Note that any one of the communication terminals 3a, 3b, 3c, and 3d is represented as a communication terminal 3 in the description below.

The photographing device 1 is a digital camera for obtaining a full spherical panoramic image. The communication terminal 3 is a computer such as a smartphone, a tablet computer, a notebook computer, a desktop computer, or a personal data assistance (PDA). Each of the image processing system 5 and the image management system 7 is a single server computer or constituted by a plurality of server computers.

The photographing device 1 can communicate with the communication terminal 3 using a short-range wireless technology, such as the near field communication (NFC) standards, or a Bluetooth (registered trademark), Wireless Fidelity (WiFi), or TransferJet (registered trademark) technology. The communication terminal 3 can communicate with the image processing system 5 and the image management system 7 via a communication network 9. The communication network 9 is built up with a wireless communication network by a mobile communication system such as the 3rd generation (3G) or worldwide interoperability for microwave access (WiMAX) system, with base stations 9a, 9b, 9c, and 9d, and with the Internet. Wired communication may be used between the photographing device 1 and the communication terminal 3, and/or between the communication terminal 3 and the communication network 9.

Next, an external appearance of the photographing device 1 will be described using FIG. 2. In FIG. 2, (a) is a left side view of the photographing device; (b) is a front view of the photographing device; and FIG. 2C is a plan view of the photographing device.

As illustrated in FIG. 2(a), the photographing device 1 has a size that can be held by one hand of a person. As illustrated in FIG. 2(a), FIG. 2(b), and FIG. 2(c), the top portion of the photographing device 1 is provided with an image pickup device 103a on the front surface (front side) and with an image pickup device 103b on the rear surface (rear side). As illustrated in FIG. 2B, the front surface of the photographing device 1 is provides with an operating unit 115 including a shutter button.

Figure 3:
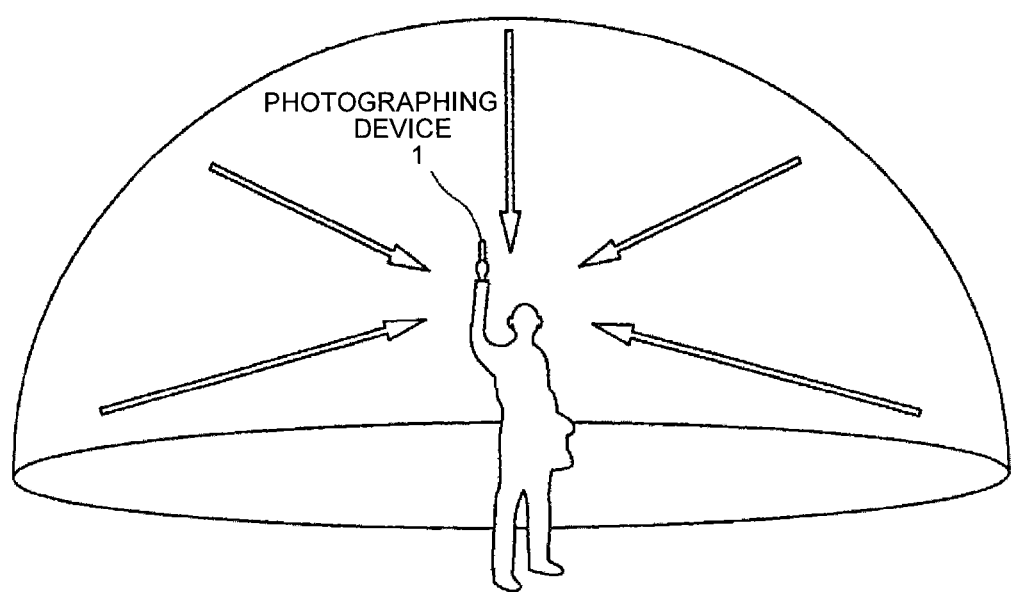
FIG. 3 is a schematic illustration illustrating a state of use of the photographing device.

Next, a state of use of the photographing device 1 will be described using FIG. 3. FIG. 3 is a schematic illustration illustrating the state of use of the photographing device. As illustrated in FIG. 3, the photographing device 1 is held with a hand and used by the user for photographing surrounding subjects. In this case, the image pickup devices 103a and 103b illustrated in FIG. 2 capture images of the subjects surrounding the user, so that two respective hemispherical images can be obtained.

Next, the images taken with the photographing device 1 and a combined image will be described using FIG. 4. In FIG. 4, (a) is a diagram illustrating the hemispherical image (front) taken with the photographing device; (b) is a diagram illustrating the hemispherical image (rear) taken with the photographing device; and (c) is a diagram illustrating an image represented by Mercator projection (hereinafter called "Mercator image").

As illustrated in FIG. 4(a), the image obtained by the image pickup device 103a is a curved hemispherical image (front) taken through a wide-angle lens 102a to be described later. As illustrated in FIG. 4(b), the image obtained by the image pickup device 103b is a curved hemispherical image (rear) taken through a wide-angle lens 102b to be described later. The photographing device 1 combines the curved hemispherical image (front) with the hemispherical image (rear) that is inverted therefrom by 180 degrees so as to create the Mercator image as illustrated in FIG. 4(c).

Next, using FIG. 5, a description will be made of a relation between the Mercator image and a selection image used for selection of the Mercator image. In FIG. 5, (a) is a diagram illustrating the Mercator image and a portion of the selection image, and (b) is a diagram illustrating the selection image. As illustrated here, the portion defined by the dashed line in the Mercator image of FIG. 5(a) is used to create the selection image of FIG. 5(b). The selection image is sent from the photographing device 1 illustrated in FIG. 1 to the communication terminal 3a and displayed on the communication terminal 3a. Then, when the user A selects the selection image illustrated in FIG. 5(b) on the communication terminal 3a, the data of the Mercator image illustrated in FIG. 4(c) is sent from the photographing device 1 to the communication terminal 3a. The Mercator image thus sent is stored in the communication terminal 3a, and, in addition, sent to the image management system 7 via the communication network 9 illustrated in FIG. 1. Thereafter, the Mercator image is sent from the image management system 7 via the communication network 9 to the communication terminals 3b, 3c, and 3d of the other users, and is stored in the communication terminals 3b, 3c, and 3d. Thus, the Mercator image can be shared.

Figure 6:
FIG. 6 is a diagram illustrating a full spherical panoramic image.

Then, the communication terminals 3b, 3c, and 3d use Open Graphics Library for Embedded Systems (OpenGL ES) to create the full spherical panoramic image illustrated in FIG. 6 from the Mercator image illustrated in FIG. 4(c). FIG. 6 is a diagram illustrating the full spherical panoramic image. The full spherical panoramic image may either be a still image or a moving image. A three-dimensional full spherical panoramic image such as illustrated in FIG. 6 is created, for example, by using OpenGL ES that causes the Mercator image illustrated in FIG. 5(a) to be pasted on the surface of a virtual three-dimensional sphere. A mere two-dimensional panoramic image may be created instead of the three-dimensional full spherical panoramic image. While the Mercator image is pasted on the virtual three-dimensional sphere here, the Mercator image may, for example, be pasted on a cube, or the two-dimensional panoramic image may be pasted on a circular cylinder.

Figure 7:
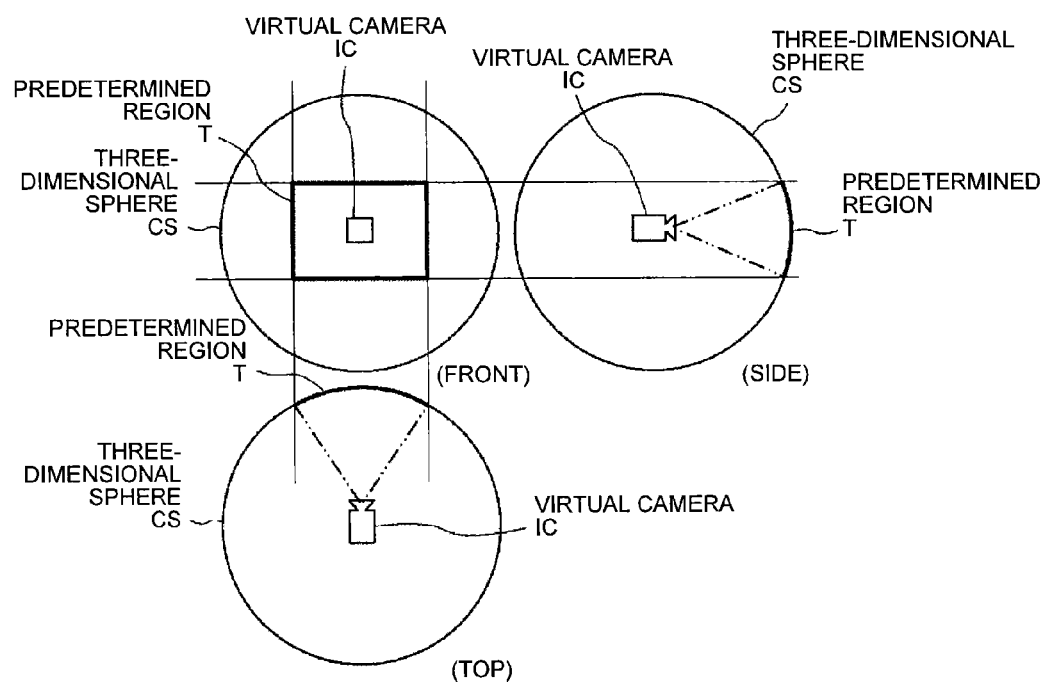
FIG. 7 is a diagram illustrating positions of a virtual camera and a predetermined region, assuming the full spherical panoramic image as a three-dimensional sphere.

Next, using FIGS. 7 and 8, a description will be made of processing of specification and display of an image of a predetermined region T (hereinafter called "predetermined-region image") in the full spherical panoramic image. FIG. 7 is a diagram illustrating the position of a virtual camera and the position of the predetermined region, assuming the full spherical panoramic image as the surface of the virtual three-dimensional sphere. In FIG. 8, (a) is a three-dimensional perspective view of FIG. 7, and (b) and (c) are diagrams illustrating the communication terminal displaying, on a display thereof, the predetermined-region images.

A virtual camera IC illustrated in FIG. 7 is positioned at a point of view of a virtual user viewing the full spherical panoramic image shown on the surface of a three-dimensional sphere CS from inside the three-dimensional sphere CS serving as the full spherical panoramic image. In FIG. 7, the virtual camera IC is specifically positioned in the center of the three-dimensional sphere, and can rotate about three axes (yaw, pitch, and roll) through the center. The predetermined region T in the full spherical panoramic image is a portion taken with the virtual camera IC in the full spherical panoramic image, and is specified by predetermined-region information. The predetermined-region information is represented by a coordinate x (rH), a coordinate y (rV), and an angle of view α (angle).

Figure 9:
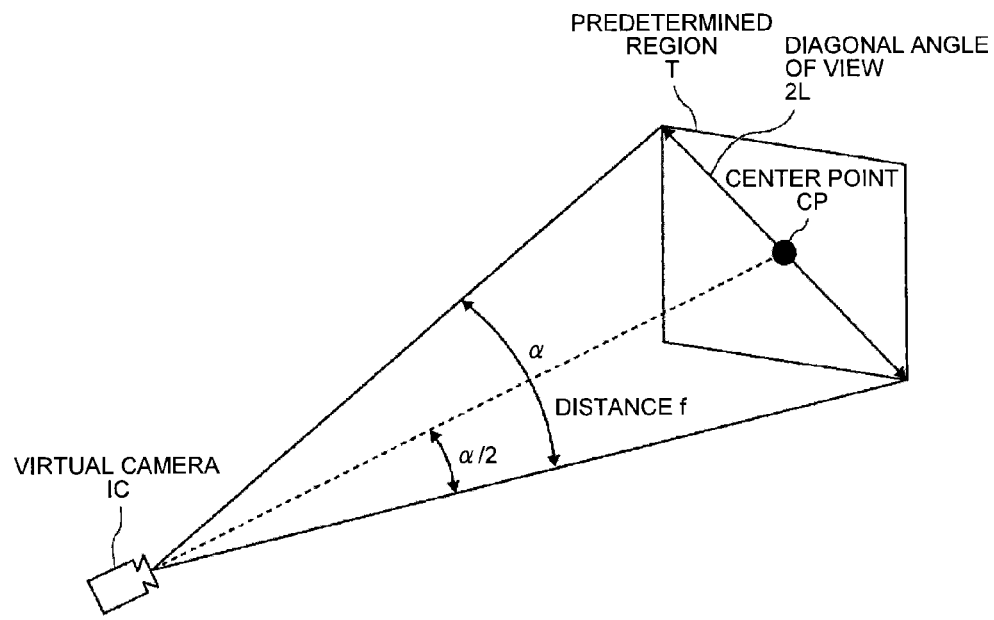
FIG. 9 is a diagram illustrating a relation between predetermined-region information and a predetermined-region image.

Here, the predetermined-region information will be described in detail using FIG. 9. FIG. 9 is a diagram illustrating a relation between the predetermined-region information and the predetermined-region image. As illustrated in FIG. 9, denoting the diagonal angle of view of the predetermined region T represented by the angle of view α of the virtual camera IC as 2L, a center point CP of 2L provides the (x, y) parameters of the predetermined-region information. The distance from the virtual camera IC to the center point CP is denoted as f. Then, in FIG. 9, a trigonometric functional equation generally expressed by Equation (1) is satisfied.

$$L/f = \tan(\alpha/2) \tag{1}$$

Zooming of the predetermined region T can be achieved by widening or narrowing the range (arc) of the angle of view α.

The image of the predetermined region T in the full spherical panoramic image illustrated in FIG. 8(a) is displayed as the predetermined-region image on a display 315 of the communication terminal 3d, as illustrated in FIG. 8(b). The predetermined-region image in this case is a partial image $P_0$ representing a part of the full spherical panoramic image. The partial image $P_0$ is an image based on the predetermined-region information that is initially set (by default) in the full spherical panoramic image illustrated in FIG. 6.

As illustrated in FIG. 8(*b*), in the predetermined-region image (partial image P$_0$), there are displayed a plurality of attention points AP1, AP2, AP3, and AP4 that have attracted attention of, and have been set by, a single user or a plurality of users using the image sharing system of the present embodiment. Images in certain ranges including the respective attention points AP1, AP2, AP3, and AP4 in the predetermined region T are displayed in the form of thumbnails T1, T2, T3, and T4, respectively, at the bottom of the display 315. If, for example, the user selects the thumbnail T1, the display 315 displays a predetermined-region image (here, a partial image P$_1$) in the full spherical panoramic image, as illustrated in FIG. 8(*c*), based on the predetermined-region information associated with the thumbnail T1. Note that the thumbnails illustrated in FIG. 8(*b*) and FIG. 8(*c*) are images created by the communication terminal 3.

Hardware Configurations of Embodiment

Next, using FIGS. 10 to 12, a description will be made in detail of hardware configurations of the photographing device, the communication terminal, the image processing system, and the image management system in the present embodiment.

The hardware configuration of the photographing device 1 will first be described using FIG. 10. FIG. 10 is a hardware configuration diagram of the photographing device. While the photographing device 1 is assumed to be an omnidirectional photographing device using two image pickup devices in the description below, the photographing device 1 may have three or more, or any number of image pickup devices, and need not be a device dedicated for omnidirectional photographing.

Figure 10:
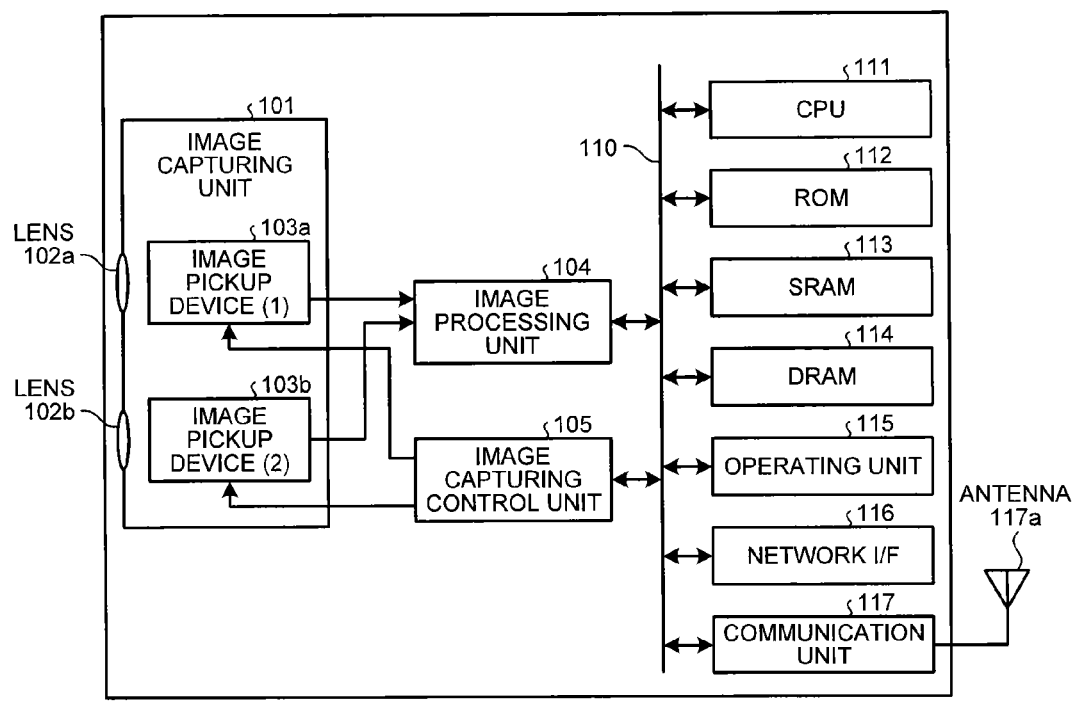
FIG. 10 is a hardware configuration diagram of the photographing device.

As illustrated in FIG. 10, the photographing device 1 is composed of an image capturing unit 101, an image processing unit 104, an image capturing control unit 105, a central processing unit (CPU) 111, a read-only memory (ROM) 112, a static random access memory (SRAM) 113, a dynamic random access memory (DRAM) 114, the operating unit 115, a network I/F 116, a communication unit 117, and an antenna 117*a*.

The image capturing unit 101 is equipped with the wide-angle lenses (what are called fisheye lenses) 102*a* and 102*b* each having an angle of view of 180 degrees or more for capturing a hemispherical image, and the two image pickup devices 103*a* and 103*b* corresponding to the respective wide-angle lenses. The image pickup devices 103*a* and 103*b* each contain an image sensor, such as a complementary metal oxide semiconductor (CMOS) sensor or a charge coupled device (CCD) sensor, that converts an optical image formed by the wide-angle lens into image data of electric signals and outputs the image data, a timing generation circuit that generates signals such as horizontal or vertical synchronizing signals and pixel clock signals of the image sensor, and a register group in which various commands, parameters, and the like required for operating the image pickup device are set.

Both of the image pickup devices 103*a* and 103*b* of the image capturing unit 101 are connected to the image processing unit 104 via a parallel I/F bus or a serial I/F bus. Both of the image pickup devices 103*a* and 103*b* of the image capturing unit 101 are, in addition, connected to the image capturing control unit 105 via a serial I/F bus (such as an I2C bus). The image processing unit 104 and the image capturing control unit 105 are connected to the CPU 111 via a bus 110. The bus 110 is also connected with the ROM 112, the SRAM 113, the DRAM 114, the operating unit 115, the network I/F 116, and so on.

The image processing unit 104 acquires image data output from the image pickup devices 103*a* and 103*b* via the parallel I/F bus, and, after applying predetermined processes to the image data, combines the image data to create data of the Mercator image such as illustrated in FIG. 4(*c*).

The image capturing control unit 105 generally serves as a master device and the image pickup devices 103*a* and 103*b* serve as slave devices, and the image capturing control unit 105 sets, using the I2C bus, commands and the like in the register groups of the image pickup devices 103*a* and 103*b*. The commands and the like as needed are received from the CPU 111. The image capturing control unit 105 also uses the I2C bus to acquire status data and the like of each register group of the image pickup devices 103*a* and 103*b*, and sends the acquired data to the CPU 111.

The image capturing control unit 105 instructs the image pickup devices 103*a* and 103*b* to output the image data at the time when the shutter button of the operating unit 115 is pressed. Some photographing devices have a preview display function and/or a function to display moving images using a display. In those functions, the image data is output from the image pickup devices 103*a* and 103*b* continuously at a predetermined frame rate (frames per minute).

The image capturing control unit 105 also serves, in cooperation with the CPU 111, as a synchronization control unit that synchronizes the output timing of the image data from the image pickup devices 103*a* and 103*b*, as will be described later. While the photographing device in the present embodiment is provided with no display unit, a display unit may be provided.

The CPU 111 controls operation of the entire photographing device 1 and executes necessary processing. The ROM 112 stores various computer programs for the CPU 111. The SRAM 113 and the DRAM 114 are work memories, which store the programs executed by the CPU 111, data during processing, and the like. Of these two memories, the DRAM 114 stores image data currently being processed by the image processing unit 104 and the data of the Mercator image after being processed.

The operating unit 115 is a collective term for devices such as various operation buttons, a power switch, the shutter button, and a touch panel having both functions of display and operation input. The user operates the operation buttons so as to enter various photographing modes and photographing conditions.

The network I/F 116 is a collective term for interface circuits (such as a USB I/F) interfacing with devices such as external media, including an SD card and a USB memory, and a personal computer. The network I/F 116 can also be a wireless network interface or a wired network interface. The data of the Mercator image stored in the DRAM 114 is recorded into the external medium via the network I/F 116, and/or, as needed, sent to an external device such as the communication terminal 3 via the network I/F 116 that serves as a network I/F.

The communication unit 117 communicates with the external device such as the communication terminal 3 via the antenna 117*a*, using the short-range wireless technology such as the Wireless Fidelity (WiFi) or Bluetooth (registered trademark) technology. The communication unit 117 can also send the data of the Mercator image to the external device of the communication terminal 3.

Next, the hardware configuration of the communication terminal 3 will be described using FIG. 11. FIG. 11 is a hardware configuration diagram of a smartphone serving as the communication terminal.

Figure 11:
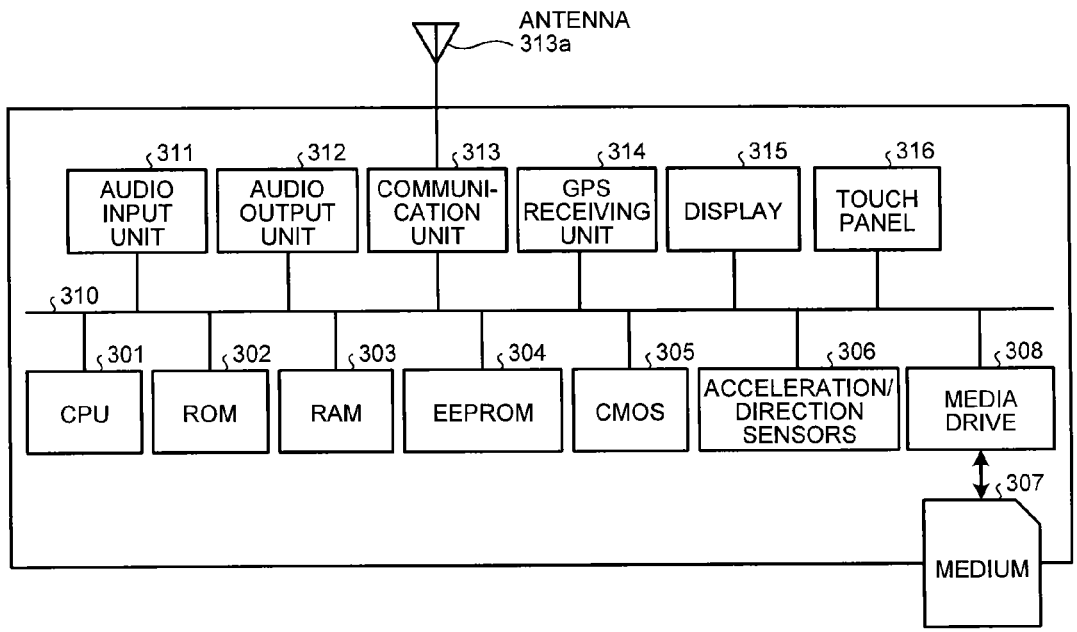
FIG. 11 is a hardware configuration diagram of the communication terminal.

As illustrated in FIG. 11, the communication terminal 3 is equipped with a CPU 301 that controls operation of the entire communication terminal 3; a ROM 302 that stores a basic input/output program; a random access memory (RAM) 303 used as a work area of the CPU 301; an electrically erasable and programmable ROM (EEPROM) 304 that reads and writes data according to the control of the CPU 301; a CMOS 305 as an image pickup device that captures an image of a subject under the control of the CPU 301 to obtain image data; various acceleration/direction sensors 306 including an electromagnetic compass detecting terrestrial magnetism or a gyrocompass, and an acceleration sensor; and a media drive 308 that controls reading and writing (storage) of data from/to a recording medium 307 such as a flash memory. Under the control of the media drive 308, data already recorded in the recording medium 307 is read, or data is newly written into the recording medium 307, which is configured to be removable.

The EEPROM 304 stores an operating system (OS), other computer programs, and various types of data executed by the CPU 301. A CCD may be used instead of the CMOS 305.

The communication terminal 3 is also equipped with an audio input unit 311 that converts sound into an audio signal; an audio output unit 312 that converts the audio signal into sound; an antenna 313a; a communication unit 313 that uses the antenna 313a to communicate with the nearby base station 9a using wireless communication signals; a global positioning systems (GPS) receiving unit 314 that receives GPS signals including position information (latitude, longitude, and altitude) of the communication terminal 3 from a GPS satellite; the display 315 of liquid crystal or organic EL that displays an image of a subject and various icons; a touch panel 316 that is mounted on the display 315, that is constituted by a pressure-sensitive or electrostatic panel, and that detects a touched position on the display 315 touched by a finger, a touch pen, or the like; and a bus line 310, including an address bus and a data bus, for electrically connecting the above-described units.

Note that the audio input unit 311 includes a microphone for receiving sound, and the audio output unit 312 includes a speaker for producing sound.

Next, the hardware configuration of the image processing system 5 and the image management system 7 will be described using FIG. 12. FIG. 12 is a hardware configuration diagram of the image processing system 5 and the image management system 7. Both of the image processing system 5 and the image management system 7 are general server computers; therefore, only the configuration of the image processing system 5 will be described below, and description of the configuration of the image management system 7 will be omitted.

Figure 12:
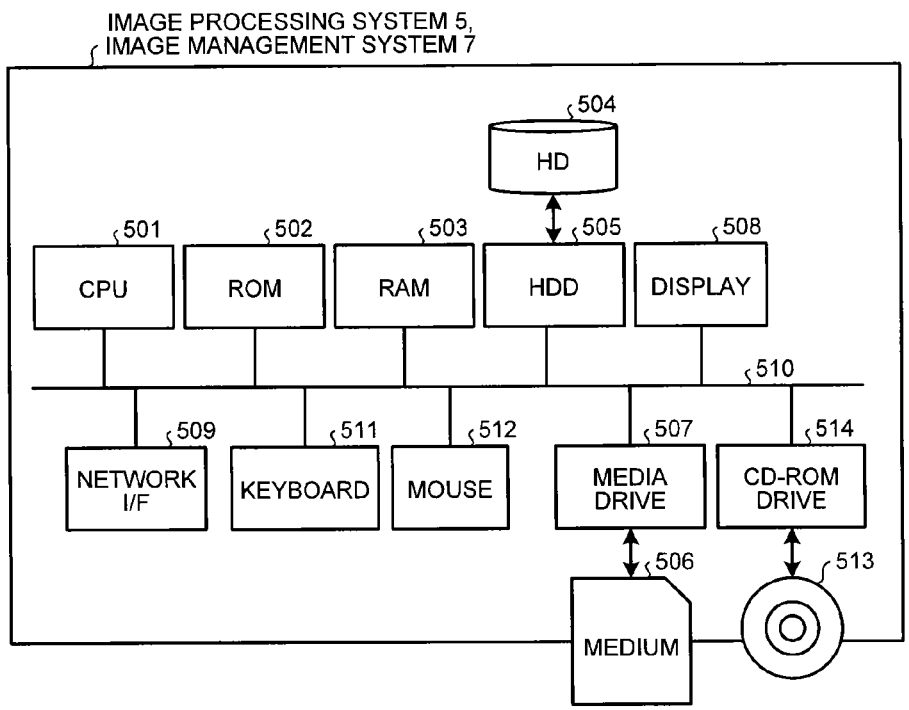
FIG. 12 is a hardware configuration diagram of an image processing system and an image management system.

The image processing system 5 is equipped with a CPU 501 that controls operation of the entire image processing system 5; a ROM 502 that stores a computer program, such as an IPL, used for driving the CPU 501; a RAM 503 used as a work area of the CPU 501; an HD 504 that stores various types of data such as computer programs for the image processing system 5; a hard disk drive (HDD) 505 that controls reading and writing of various types of data from/to the HD 504 according to the control of the CPU 501; a media drive 507 that controls reading and writing (storage) of data from/to a recording medium 506 such as a flash memory; a display 508 that displays various types of information such as a cursor, menus, windows, characters, and images; a network I/F 509 for data communication using the communication network 9; a keyboard 511 provided with a plurality of keys for entering characters, numeric values, various instructions, and the like; a mouse 512 used for selecting or executing various instructions, selecting an object to be processed, moving a cursor, and the like; a compact disc read-only memory (CD-ROM) drive 514 that controls reading and writing of various types of data from/to a CD-ROM 513 as an example of a removable recording medium; and a bus line 510, including an address bus and a data bus, for electrically connecting the above-described constituent elements as illustrated in FIG. 12.

Functional Configurations of Embodiment

Figure 13:
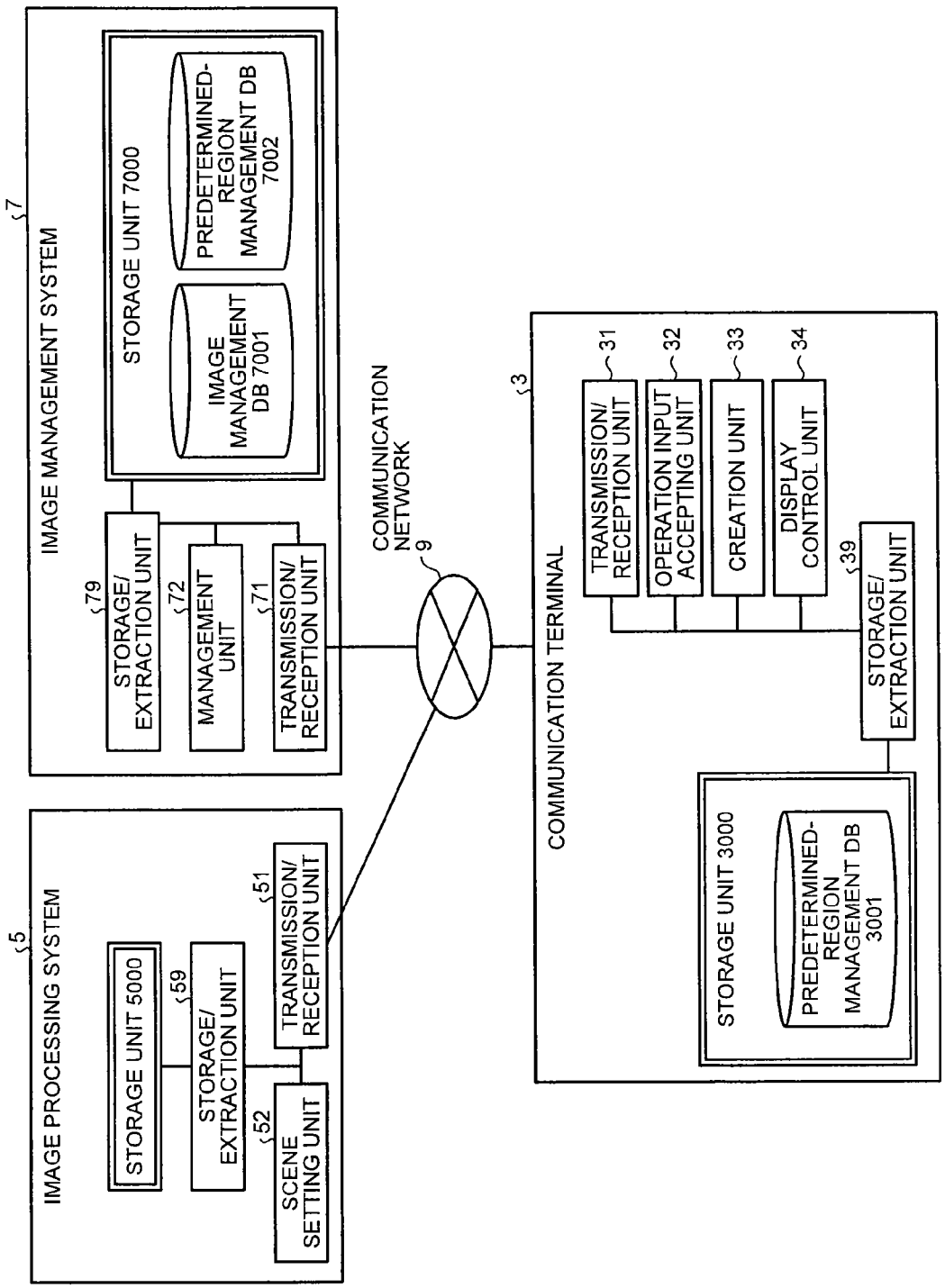
FIG. 13 is a functional block diagram of the communication terminal, the image processing system, and the image management system according to the first embodiment.

Next, functional configurations of the present embodiment will be described using FIG. 13. FIG. 13 is a functional block diagram of the communication terminal 3, the image processing system 5, and the image management system 7 that constitute a part of the image sharing system of the present embodiment. In FIG. 13, the communication terminal 3, the image processing system 5, and the image management system 7 can communicate data via the communication network 9.

Functional Configuration of Communication Terminal

As illustrated in FIG. 13, the communication terminal 3 includes a transmission/reception unit 31, an operation input accepting unit 32, a creation unit 33, a display control unit 34, and a storage/extraction unit 39. Each of these units is a function or means implemented by operation of any of the constituent elements illustrated in FIG. 11 driven by commands from the CPU 301 according to the programs for the communication terminal 3 that are loaded from the ROM 302 or the EEPROM 304 and deployed in the RAM 303.

The communication terminal 3 also includes a storage unit 3000 built up with the ROM 302, the RAM 303, and the EEPROM 304 illustrated in FIG. 11. In the storage unit 3000, there is established a predetermined-region management database (DB) 3001 that is composed of a predetermined-region management table to be described later. The storage unit 3000 stores therein the data of the photographed image (Mercator image), the selection images, and thumbnails.

Predetermined-Region Management Table

FIG. 14 is a conceptual diagram illustrating the predetermined-region management table. The predetermined-region management table manages predetermined-region management information. The predetermined-region management information includes thumbnail identification information for identifying a thumbnail, image identification information for identifying a full spherical panoramic image, the predetermined-region information for specifying a predetermined region in the full spherical panoramic image, and a plurality of types of related information related to the predetermined region, in a manner corresponding to each other.

Among these types of information, the thumbnail identification information is, for example, a thumbnail ID for identifying a thumbnail. The thumbnail identification information may be, instead of the thumbnail ID, a file name of a thumbnail if the file name can uniquely specify the thumbnail.

The image identification information is, for example, an image ID for identifying a full spherical panoramic image. The image identification information may be, instead of the image ID, another identifier such as a file name if the identifier can uniquely specify the image.

The related information includes, for example, a "specification date" indicating the date when a user specified the predetermined-region image in the full spherical panoramic image, a "specifying user's name" indicating the user who specified the predetermined-region image, and a "scene" indicating the scene of the predetermined-region image. The related information may include, as another example, in addition to the date of specification of the predetermined-region image in the full spherical panoramic image, the time of the specification, the location where the photographed image was taken, and other information.

Configurations of Functions of Communication Terminal

Next, configurations of functions of the communication terminal 3 will be described more in detail using FIGS. 11 and 13.

The transmission/reception unit 31 of the communication terminal 3 is mainly implemented by processing by the communication unit 313 and the CPU 301 illustrated in FIG. 11, and sends and receives various types of data (or information) to/from the image processing system 5 and the image management system 7 via the communication network 9.

The operation input accepting unit 32 is mainly implemented by processing of the touch panel 316 and the CPU 301, and accepts various types of selection and input from the user.

The creation unit 33 is mainly implemented by processing of the CPU 301. Based on the predetermined-region image in the full spherical panoramic image identified by the image identification information extracted by the storage/extraction unit 39 (the predetermined-region image specified in the predetermined-region information extracted by the storage/extraction unit 39), the creation unit 33 creates a thumbnail for the predetermined-region image, and also creates the thumbnail identification information for identifying the created thumbnail. The creation unit 33 also associates the thumbnail with the thumbnail identification information.

Furthermore, based on the type of related information of the predetermined-region management information managed by the predetermined-region management DB 3001, the creation unit 33 creates a related information selection menu to be described later. In the case, for example, of creating the related information selection menu indicating the specifying users' names, the creation unit 33 extracts the specifying users' names from the related information, and creates a related information selection menu indicating the specifying users' names such as illustrated in FIG. 29A to be described later.

The display control unit 34 is mainly implemented by processing of the CPU 301, and controls the display 315 to display various images, characters, and the like. For example, in a full spherical panoramic image identified by the image identification information corresponding to predetermined related information that is selected by the user and accepted by the operation input accepting unit 32, the display control unit 34 controls the display 315 to display the thumbnail for the predetermined-region image that is specified by the predetermined-region information corresponding to the selected and accepted predetermined related information.

The display control unit 34 also controls the display 315 to display the predetermined-region image corresponding to the thumbnail selected at the operation input accepting unit 32.

Figure 27:
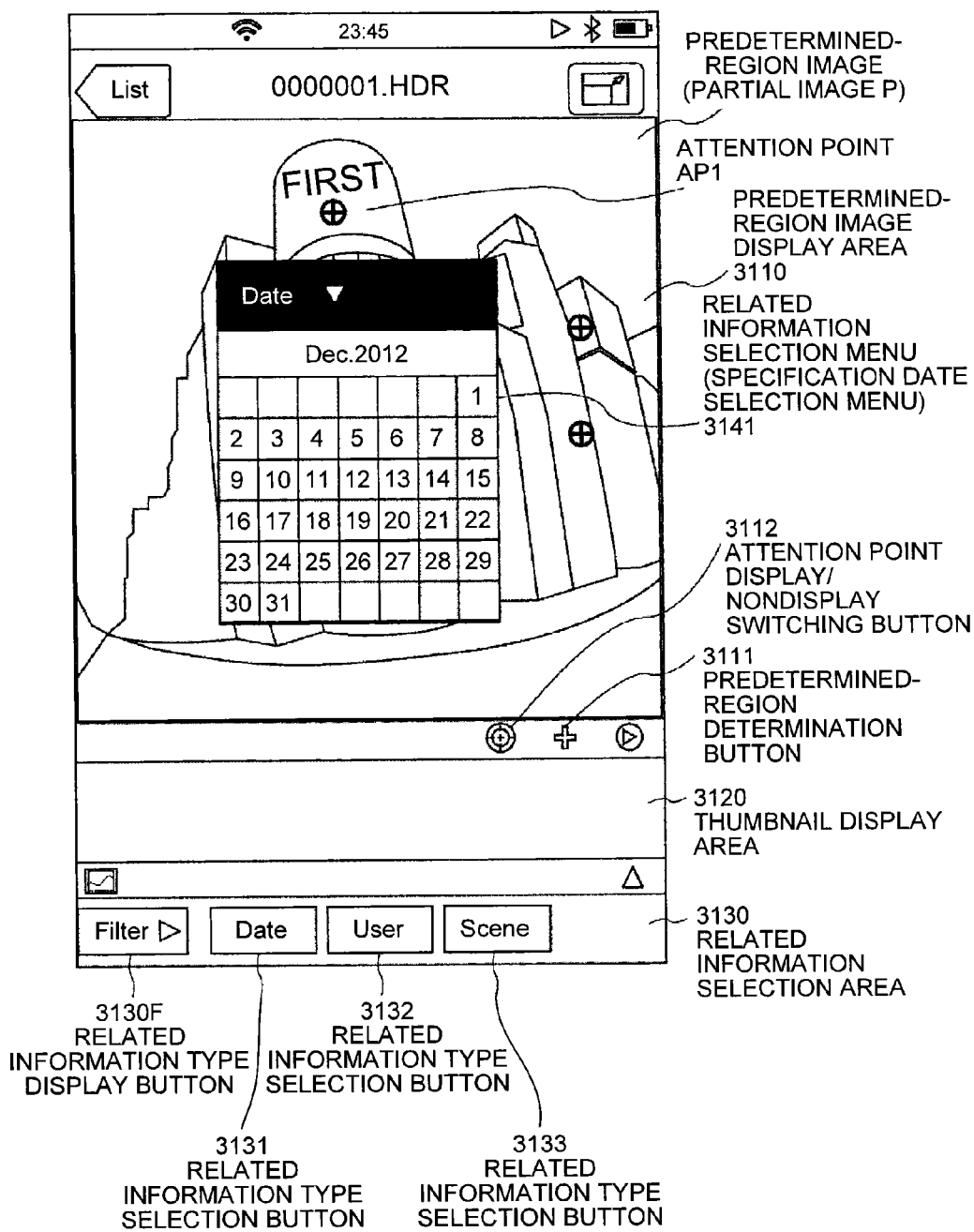
FIG. 27 is a diagram illustrating a creation date selection menu that is an example of a related information selection menu.

The display control unit 34 further controls the display 315 to display, on the predetermined-region image displayed on the display 315, a related information selection menu (specification date selection menu) 3141 for selecting the date of specification of the predetermined-region image, as illustrated in FIG. 27 to be described later. In this case, the storage/extraction unit 39 reads data of the specification date selection menu stored in advance in the storage unit 3000, so that the display control unit 34 can control the display 315 to display the specification date selection menu.

The storage/extraction unit 39 stores various types of data (or information) in the storage unit 3000, and extracts the various types of data (or information) from the storage unit 3000. The storage/extraction unit 39 records into and extracts from the storage unit 3000 the data such as the photographed image (Mercator image), the selection images, and the thumbnails. The storage/extraction unit 39, for example, searches the predetermined-region management DB 3001 based on the predetermined related information accepted by the operation input accepting unit 32 so as to extract the image identification information and the predetermined-region information corresponding to the predetermined related information. In this case, the display control unit 34 controls the display 315 to display the thumbnails for the predetermined-region images specified by the predetermined-region information extracted by the storage/extraction unit 39, in the full spherical panoramic image identified by the image identification information extracted by the storage/extraction unit 39.

Functional Configuration of Image Processing System

Next, a functional configuration of the image processing system 5 will be described in detail using FIG. 13. The image processing system 5 includes a transmission/reception unit 51, a scene setting unit 52, and a storage/extraction unit 59. Each of these units is a function or means implemented by operation of any of the constituent elements illustrated in FIG. 12 driven by commands from the CPU 501 according to the programs for the image processing system 5 that are loaded from the HD 504 and deployed in the RAM 503.

The image processing system 5 also includes a storage unit 5000 built up with the RAM 503 and the HD 504 illustrated in FIG. 12. The storage unit 5000 stores therein various types of data (or information).

Configurations of Functions of Image Processing System

Next, configurations of functions of the image processing system 5 will be described in detail using FIGS. 12 and 13.

The transmission/reception unit 51 of the image processing system 5 is mainly implemented by processing of the network I/F 509 and the CPU 501 illustrated in FIG. 12, and sends and receives various types of data (or information) to/from the communication terminal 3 and the image management system 7 via the communication network 9.

Based on information such as colors and lightness of the predetermined-region image in the full spherical panoramic image, the scene setting unit 52 determines which scene of a figure, landscape, structure, and others is represented by the predetermined-region image, and sets an optimal scene for the predetermined-region image. This method for setting a scene is performed based on color information and shape information in the full spherical panoramic image by using a general automatic scene recognition function used in a digital camera.

The storage/extraction unit 59 stores various types of data (or information) in the storage unit 5000, and extracts the various types of data (or information) from the storage unit 5000.

Functional Configuration of Image Management System

Next, a functional configuration of the image management system 7 will be described in detail using FIGS. 12 and 13. The image management system 7 includes a transmission/reception unit 71, a management unit 72, and a storage/ extraction unit 79. Each of these units is a function or means implemented by operation of any of the constituent elements illustrated in FIG. 12 driven by commands from the CPU 501 according to the programs for the image management system 7 that are loaded from the HD 504 and deployed in the RAM 503.

The image management system 7 also includes a storage unit 7000 built up with the RAM 503 and the HD 504 illustrated in FIG. 12. In the storage unit 7000, there is established an image management DB 7001 that is composed of an image management table to be described later. In the storage unit 7000, there is also established a predetermined-region management DB 7002 that is composed of a predetermined-region management table to be described later.

Image Management Table

FIG. 15 is a conceptual diagram illustrating the image management table. The image management table manages image management information. The image management information includes image identification information for identifying the full spherical panoramic image (photographed image) and auxiliary information serving as metadata of this full spherical panoramic image and the like, in a manner corresponding to each other.

Of these types of information, the image identification information is the same information as the image identification information illustrated in FIG. 14. The auxiliary information includes "disclosure information" indicating whether the user discloses the image in the image sharing system of the present embodiment, a "photographed image data size (MB)", a "shooting date/time of photographed image", and a "number of attention points". Here, an "○" mark at the disclosure information indicates that the image is disclosed whereas an "X" mark indicates that the image is not disclosed. The number of attention points refers to the number of the attention points set in one full spherical panoramic image as illustrated in FIG. 8B. The auxiliary information may include, as another example, in addition to the date/time of shooting of the photographed image, the location where the photographed image was taken and other information.

Predetermined-Region Management Table

FIG. 16 is a conceptual diagram illustrating the predetermined-region management table. Note that the predetermined-region management table illustrated in FIG. 16 is used for managing the photographed images uploaded by the users whereas the predetermined-region management table illustrated in FIG. 14 is used for locally managing the photographed image on the communication terminal 3 individually by the user.

Configurations of Functions of Image Management System

Next, configurations of functions of the image management system 7 will be described in detail using FIG. 13.

The transmission/reception unit 71 of the image management system 7 is mainly implemented by processing of the network I/F 509 and the CPU 501 illustrated in FIG. 12, and sends and receives various types of data (or information) to/from the communication terminal 3 and the image processing system 5 via the communication network 9.

The management unit 72 adds the image identification information into the header of a photographed image sent from the communication terminal 3 to manage the photographed image in the image management system 7.

The storage/extraction unit 79 stores various types of data (or information) in the storage unit 7000, and extracts the various types of data (or information) from the storage unit 7000.

Processing and Operation of Embodiment

Next, processing and operation of the present embodiment will be described using FIGS. 17 to 25. A process of uploading the photographed image will first be described using FIG. 17. FIG. 17 is a sequence diagram illustrating the process of uploading the photographed image.

As illustrated in FIG. 17, the photographing device 1 combines the two hemispherical images illustrated in FIG. 4(a) and FIG. 4(b) to create the photographed image (Mercator image) illustrated in FIG. 4(c), and further creates the selection image from the photographed image (Step S1), as illustrated in FIG. 5.

Then, the communication terminal 3a requests the selection image from the photographing device 1 (Step S2). This causes the photographing device 1 to send, to the communication terminal 3a, the selection image created at Step S1 above and the image ID of a photographed image on which the selection image is based (Step S3). As a result, the transmission/reception unit 31 of the communication terminal 3a receives the selection image and the image ID.

Then, the display control unit 34 of the communication terminal 3a controls the display 315 illustrated in FIG. 11 to display the selection image, and prompts the user A to select the selection image (Step S4). When, in response, the user A selects a portion of the selection image on the touch panel of the display 315, the operation input accepting unit 32 accepts the selection (Step S5). This causes the transmission/reception unit 31 to request the photographed image on which the selection image is based from the photographing device 1 (Step S6). In this case, the transmission/reception unit 31 sends the image ID sent in at Step S3 above back to the photographing device 1, so that the desired photographed image is specified. Thus, the photographing device 1 accepts the request for the photographed image.

Then, the photographing device 1 sends, to the communication terminal 3a, the photographed image for which the request is accepted at Step S6 above and the auxiliary information such as the metadata of the photographed image (Step S7). As a result, the transmission/reception unit 31 of the communication terminal 3a receives the photographed image and the auxiliary information.

Then, the display control unit 34 of the communication terminal 3a controls the display 315 to display thereon the photographed image (Step S8). This allows the user A to confirm the photographed image to be uploaded to the image management system 7.

Then, if the user A uploads the photographed image, the transmission/reception unit 31 of the communication terminal 3a sends the photographed image to the image management system 7 (Step S9). At this time, the auxiliary information of the photographed image is also sent with the photographed image. As a result, the transmission/reception unit 71 of the image management system 7 receives the photographed image and the auxiliary information thereof.

Then, in order to manage the photographed image received at Step S7 in the image management system 7, the management unit 72 of the image management system 7 adds the image identification information into the header of the photographed image (Step S10). Note that the image identification information is an ID that is different from the image ID sent and received at Steps S3 and S6 above, and that is added for independently managing the photographed image in the image management system 7.

Then, the storage/extraction unit 79 stores, in the image management DB 7001, the same image identification information as the image identification information added to the photographed image and the auxiliary information received at Step S9 above, in a manner corresponding to each other as the image management information (Step S11).

Then, the management unit 72 creates a shared selection image from the photographed image, and adds the same image identification information as the image identification information added at Step S10 above into the header of the data of the shared selection image (Step S12). Note that the shared selection image is an image that is selected by the user before the user downloads a desired photographed image from the image management system 7 to specify the photographed image to be downloaded. The shared selection image is illustrated in FIG. 19, and will be further described later. The shared selection image is created, for example, using the same method as that of being illustrated at Step S1 above and FIG. 5.

Then, the storage/extraction unit 79 stores, in the storage unit 7000 (Step S13), the photographed image to which the image identification information is added at Step S10 above and the shared selection image to which the image identification information is added at Step S11 above. This means that the image management information managed in the image management DB 7001 is associated with the photographed image and the shared selection image managed in the storage unit 7000 through the same image identification information.

Figure 18:
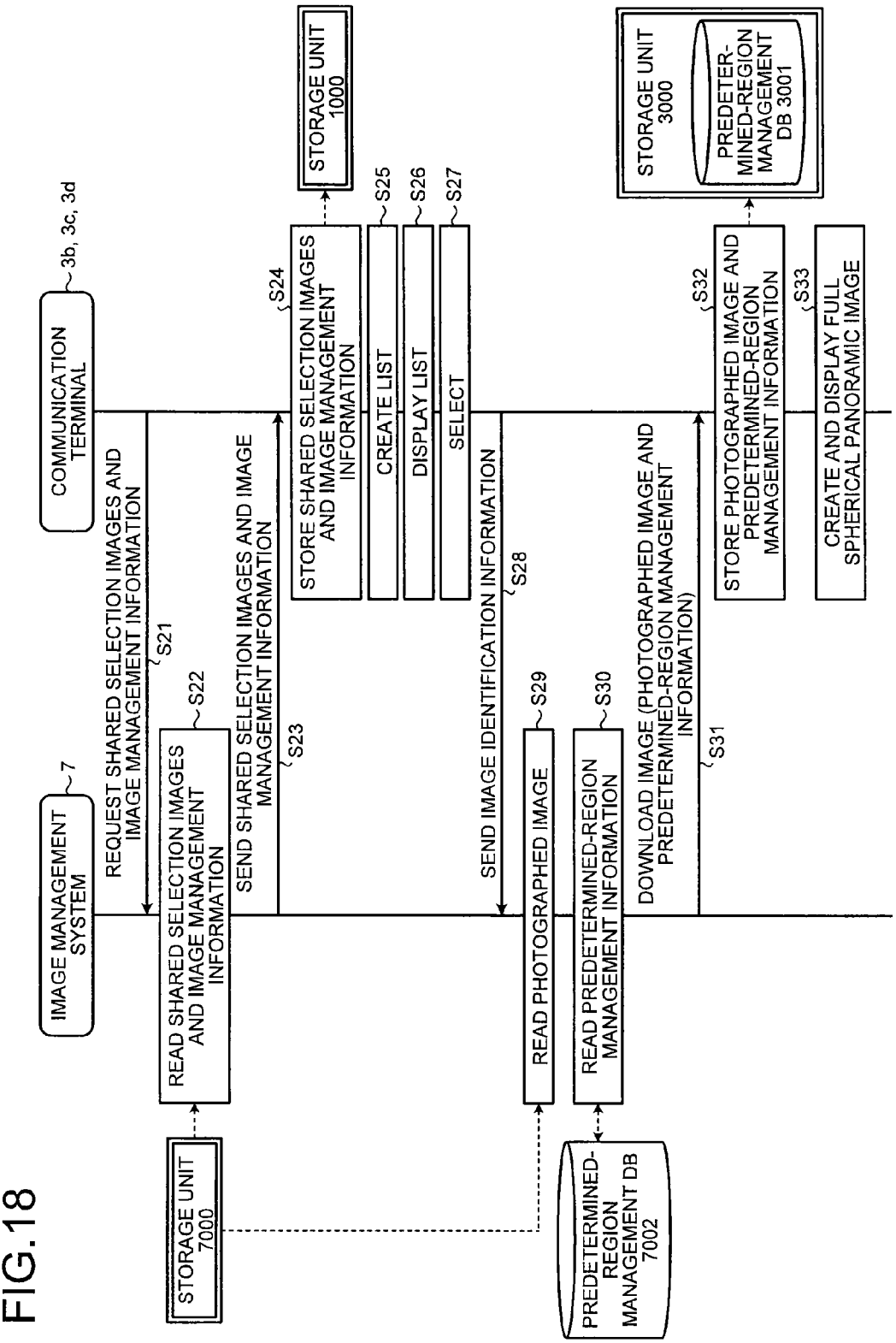
FIG. 18 is a sequence diagram illustrating a process of downloading a photographed image and predetermined-region management information.

Next, using FIG. 18, a description will be made of a process in which the communication terminal 3b downloads the photographed image and the predetermined-region management information. FIG. 18 is a sequence diagram illustrating the process of downloading the photographed image and the predetermined-region management information.

First, the transmission/reception unit 31 of the communication terminal 3b requests shared selection images and the image management information from the image management system 7 (Step S21). This causes the transmission/reception unit 71 of the image management system 7 to accept the request.

Next, the storage/extraction unit 79 of the image management system 7 reads data of the shared selection images from the storage unit 7000, and reads the image management information from the image management DB 7001 of the storage unit 7000 (Step S22). Then, the transmission/reception unit 71 sends the shared selection images and the image management information read at Step S22 above to the communication terminal 3b that is the source of the request (Step S23). As a result, the transmission/reception unit 31 of the communication terminal 3b receives the shared selection images and the image management information. Then, the storage/extraction unit 39 of the communication terminal 3b stores the shared selection images and the image management information received at Step S23 above in the storage unit 3000 (Step S24).

Then, based on the shared selection images and the image management information, the creation unit 33 of the communication terminal 3b creates a shared image selection list for selection of the photographed image (Step S25). Then, the display control unit 34 of the communication terminal 3b controls the display 315 of the communication terminal 3b to display this shared image selection list SL as illustrated in FIG. 19(a) so as to prompt the user B to select a shared selection image CE (Step S26). Note that, as illustrated in FIG. 19(a), the shared image selection list SL shows the shared selection image CE with the image management information attached thereto. For example, buildings in a commercial area are displayed as the shared selection image CE, and the shooting date/time (2011 Sep. 20, 11:21), the photographed image data size (13.1 MB), and the number of attention points set (0) are displayed as the image management information.

Next, when the user B selects the desired shared selection image CE, the operation input accepting unit 32 of the communication terminal 3b accepts the selection (Step S27). Then, the transmission/reception unit 31 of the communication terminal 3b sends the image identification information added to the shared selection image CE selected at Step S27 above to the image management system 7 (Step S28). As a result, the transmission/reception unit 71 of the image management system 7 receives the image identification information.

Then, the storage/extraction unit 79 of the image management system 7 reads, from the storage unit 7000, the photographed image to which the same image identification information as the image identification information received above is added (Step S29). Furthermore, the storage/extraction unit 79 reads, from the predetermined-region management DB 7002 of the storage unit 7000, the predetermined-region management information that includes the same image identification information as the image identification information received above (Step S30). In the image management system 7, based on the "disclosure" attribute in the auxiliary information of the image management information managed by the image management DB 7001, the management unit determines before Step S29 above that the process of Steps S29 and S30 above need not be executed if the attribute indicates nondisclosure (if an "X" mark is given).

Next, the transmission/reception unit 71 sends, to the communication terminal 3b, the photographed image read at Step S29 above and the predetermined-region management information read at Step S30 above (Step S31). As a result, the transmission/reception unit 31 of the communication terminal 3b receives the photographed image and the predetermined-region management information, and thus the downloading of the photographed image is terminated. Note that no attention point has yet been set in the photographed image received by the communication terminal 3b, so that the predetermined-region management information contains nothing (is empty).

Then, the storage/extraction unit 39 of the communication terminal 3b stores the photographed image downloaded at Step S31 above in the storage unit 3000, and also stores the predetermined-region management information downloaded at Step S31 above in the predetermined-region management DB 3001 of the storage unit 1000 (Step S32).

Then, the creation unit 33 of the communication terminal 3b creates a full spherical panoramic image such as illustrated in FIG. 6 based on the photographed image, and the display control unit 34 controls the display 315 of the communication terminal 3b to display the full spherical panoramic image (Step S33).

Here, when the user B operates the communication terminal 3b, using the touch panel 316, to enlarge the full spherical panoramic image displayed on the display 315, the operation input accepting unit 32 accepts the operation of the user B to cause the display control unit 34 to enlarge and display a part of the full spherical panoramic image as a planar predetermined-region image such as illustrated in FIG. 19(b).

In FIG. 19(b), the display 315 displays broadly divided areas of a predetermined-region image display area 3110, a thumbnail display area 3120, and a related information selection area 3130. The predetermined-region image display area 3110 is an area that displays the full spherical panoramic image or the planar predetermined-region image such as illustrated in FIG. 19(*b*). The thumbnail display area 3120 is an area that displays thumbnails for the planar predetermined-region images including attention points set by the user. The related information selection area 3130 is an area that is used by the user for selection to narrow down the types of the thumbnails, and that displays related information selection buttons to be described later. The related information selection area 3130 displays a related information type display button 3130F for displaying the related information selection buttons. When the user selects the related information type display button 3130F, various related information selection buttons to be described later are displayed.

Figure 20:
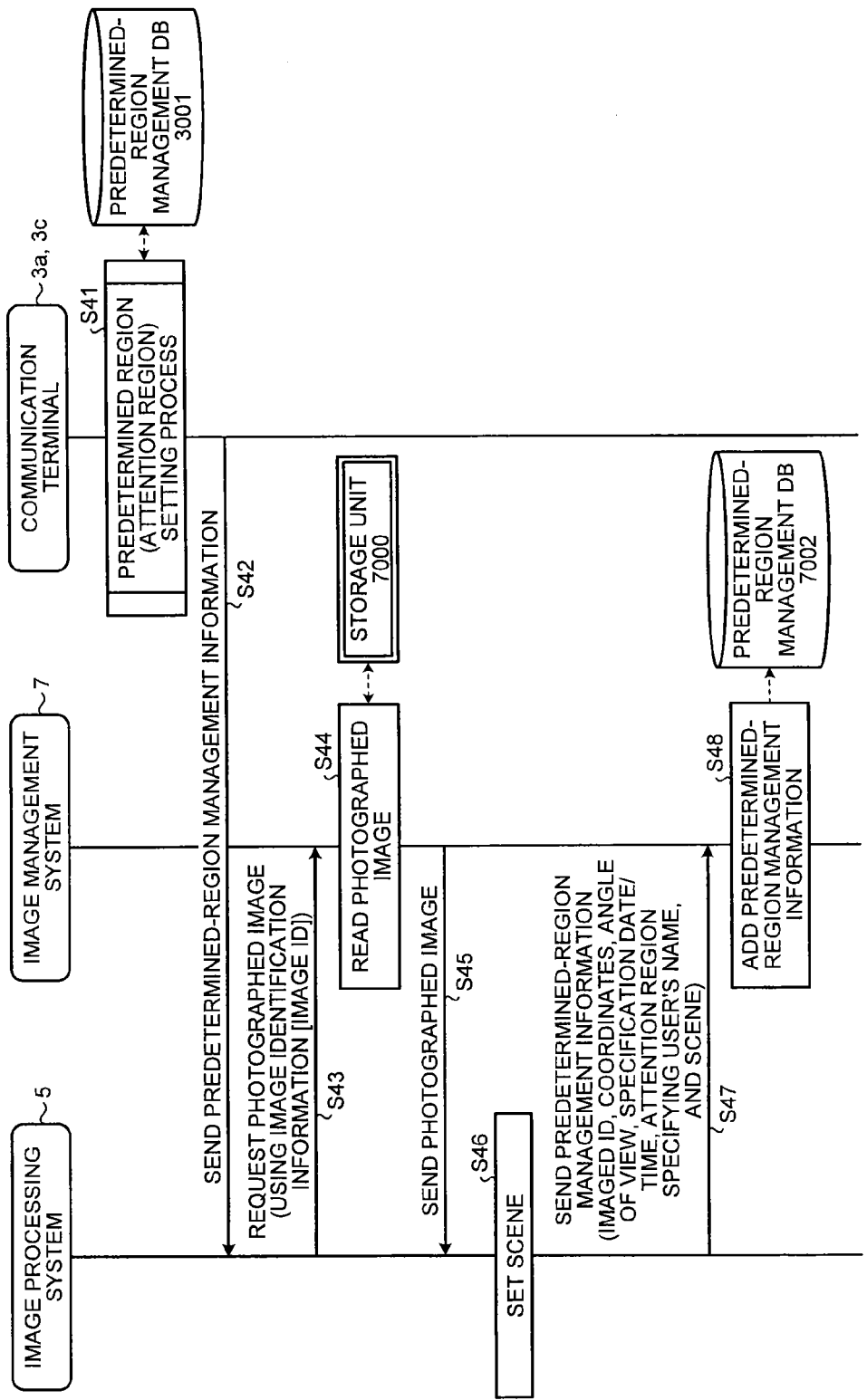
FIG. 20 is a sequence diagram illustrating a process of setting and registering a predetermined region by a user.

Next, using FIG. 20, a description will be made of a case in which the user B sets a predetermined region including attention points and registers the predetermined region in the image management system 7. FIG. 20 is a sequence diagram illustrating the process of setting and registering the predetermined region by the user!

Figure 21:
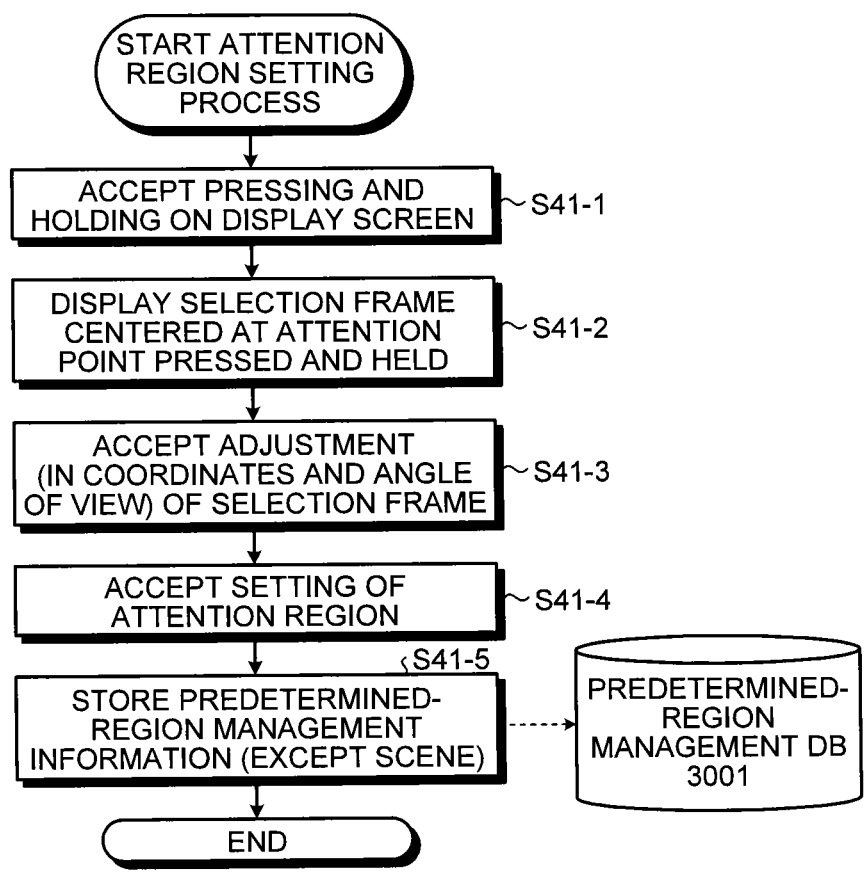
FIG. 21 is a flowchart illustrating the setting process of the predetermined region.
Figure 22:
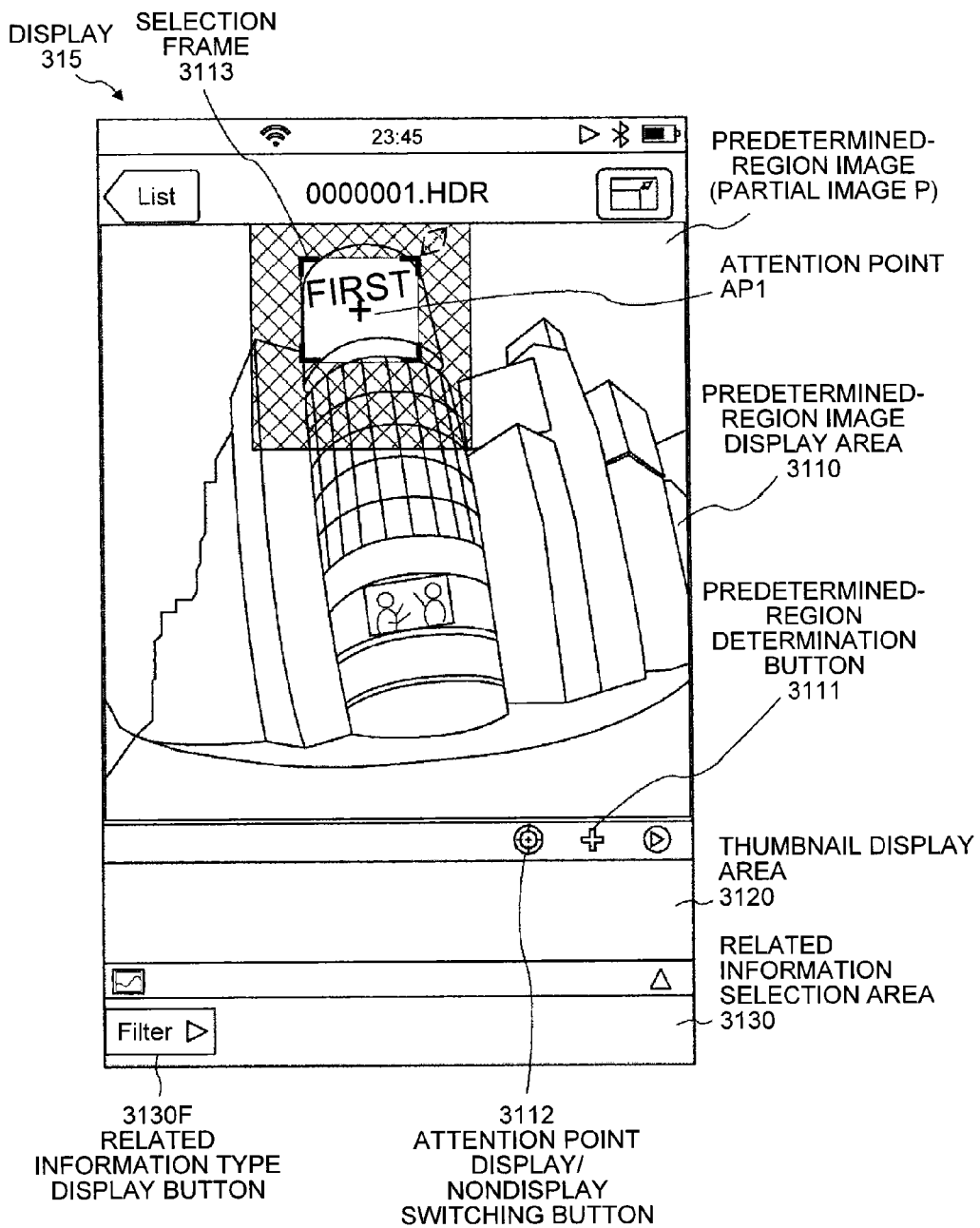
FIG. 22 is a screen example illustrating the setting process of the predetermined region.

The communication terminal 3*b* performs the setting process of the predetermined region including the attention points (Step S41). Here, Step S41 will be described more in detail using FIGS. 21 and 22. FIG. 21 is a flowchart illustrating the setting process of the predetermined region. FIG. 22 is a screen example illustrating the setting process of the predetermined region.

First, as illustrated in FIG. 22, when the user B presses and holds the attention point AP1 that is a position that attracts the attention of the user B in the predetermined-region image (partial image P), the operation input accepting unit 32 accepts the attention point AP1 (Step S41-1).

Next, as illustrated in FIG. 22, the display control unit 34 controls the display 315 to display a selection frame 3113 centered at the attention point AP1 that has been pressed and held (Step S41-2). Note that the perimeter of the selection frame 3113 is masked so as to distinguish the selection frame 3113.

Then, when the user B adjusts the selection frame 3113, the operation input accepting unit 32 accepts the adjustment of the selection frame (Step S41-3). This adjustment of the selection frame 3113 changes the coordinates and the angle of view of the virtual camera illustrated in FIG. 7.

Then, when the user B presses a predetermined-region determination button 3111, the operation input accepting unit 32 accepts the setting of the region after being adjusted at Step S41-3 above as an attention region (Step S41-4). This causes the storage/extraction unit 39 to store the predetermined-region management information on the attention region accepted at Step S41-4 above in the predetermined-region management DB 3001 (Step S41-5). This communication terminal uses the predetermined-region management information to specify the predetermined region of the photographed image to be managed and to generate a thumbnail. This communication terminal also generates thumbnail identification information corresponding to the generated thumbnail, and stores, in the predetermined-region management DB 3001, the thumbnail and the thumbnail identification information in such a manner as to correspond to the predetermined-region management information.

At this time, the image identification information, the predetermined-region information, and the related information except the scene are stored among the types of predetermined-region management information such as illustrated in FIG. 14. Specifically, the image identification information is the image ID of the photographed image managed in the communication terminal 3. The predetermined-region information is the coordinates and the angle of view of the virtual camera that are set at Step S41-4 above. The related information is the date/time when the predetermined-region image was specified by setting the predetermined region including the attention point at Step S41-4 above and the name of the user B (who specified the predetermined region) set at Step S41-4 above, and does not include the scene of the attention region. An attention point display/nondisplay switching button 3112 is a button for switching between display and nondisplay of the attention point to be described later.

Next, referring back to FIG. 20, the transmission/reception unit 31 of the communication terminal 3*b* sends, to the image processing system 5, the predetermined-region management information and the thumbnail identification information stored at Step S41-5 above (Step S42). As a result, the transmission/reception unit 51 of the image processing system 5 receives the predetermined-region management information and the thumbnail identification information.

Then, the image processing system 5 sends the image identification information in the predetermined-region management information received at Step S42 above to the image management system 7 so as to request a photographed image corresponding to the image identification information (Step S43). As a result, the transmission/reception unit 71 of the image management system 7 receives the image identification information and accepts the request for the photographed image corresponding to the image identification information.

Then, the storage/extraction unit 79 in the image management system 7 reads, from the storage unit 7000, the photographed image to which the image identification information received at Step S43 above is added (Step S44). Then, the transmission/reception unit 71 sends the photographed image read at Step S44 above to the image processing system 5 (Step S45). As a result, the transmission/reception unit 51 of the image processing system 5 receives the photographed image.

Then, based on the predetermined-region information of the predetermined-region management information received at Step S42 above and on the photographed image received at Step S45 above, the scene setting unit 52 in the image processing system 5 sets a scene of the predetermined region set at Step S41-4 above (Step S46). Specifically, based on the photographed image and the predetermined-region information, and based on the information such as colors and lightness of the predetermined-region image in the photographed image, the scene setting unit 52 determines which scene of a figure, landscape, structure, and others is represented by the predetermined region, and sets an optimal scene for the predetermined-region image. Note that the communication terminals 3*b* and 3*c* receive the information of the already set scene from the image management system 7 when the communication terminals 3*b* and 3*c* next access the image management system 7 and execute the process of Steps from S21 to S31 to receive the predetermined-region management information.

Then, the transmission/reception unit 51 of the image processing system 5 sends, to the image management system 7, the predetermined-region management information including the scene determined at Step S46 above and the thumbnail identification information (Step S47). As a result, the transmission/reception unit 71 of the image management system 7 receives the predetermined-region management information and the thumbnail identification information.

Then, the storage/extraction unit 79 of the image management system 7 stores the predetermined-region management information and the thumbnail identification information received at Step S47 above in the predetermined-region management DB 7002 so as to add new pieces of predetermined-region management information and thumbnail identification information (Step S48).

Next, using FIG. 23, a description will be made of a case in which, after the user B illustrated in FIG. 1 sets the attention region, the user C downloads, as illustrated in FIG. 18, the photographed image, the predetermined-region management information, and the thumbnail identification information from the image management system 7. In FIG. 23, (a) and (b) are screen examples illustrating the setting process of the predetermined region, and (a) illustrates the screen for the user C corresponds to FIG. 19B illustrating the screen for the user B, and (b) illustrates the screen for the user C corresponds to FIG. 22 illustrating the screen for the user B.

In FIG. 23(*a*), the attention point AP1 set by the user B is displayed in a certain position in the predetermined-region image (partial image P). The thumbnail T1 for the predetermined-region image including the attention point AP1 set by the user B is displayed in the thumbnail display area 3120. At the upper right corner in the thumbnail T1, there is displayed the number of comments entered by the users of the image sharing system of the present embodiment who have browsed this predetermined-region image.

The thumbnail is an image created by the creation unit 33 of the communication terminal 3c of the user C. The creation unit 33 creates the thumbnail based on the photographed image and the predetermined-region management information downloaded by the user C at Step S31 above. Specifically, based on the predetermined-region information in the predetermined-region management information received together with the downloaded photographed image, the creation unit 33 determines the coordinates and the angle of view of the virtual camera IC in the full spherical panoramic image based on the photographed image as illustrated in FIG. 7, and reduces the size of the predetermined-region image in the predetermined region T in this case. Thus, the creation unit 33 creates the thumbnail. The created thumbnail is then associated with the thumbnail identification information that is already received.

Then, when the user C wants to add a new attention point, the user C designates the attention point AP2 illustrated in FIG. 23(*b*) and sets the perimeter of the attention point AP2 as a predetermined-region, so that the same process as that of being illustrated in FIGS. 20 and 21 is executed.

As described above, the various users using the image sharing system set the attention regions, so that the users can know the places attracting attentions of other users. This brings about an effect that the users can quickly browse the places attracting attentions of other users.

Figure 24:
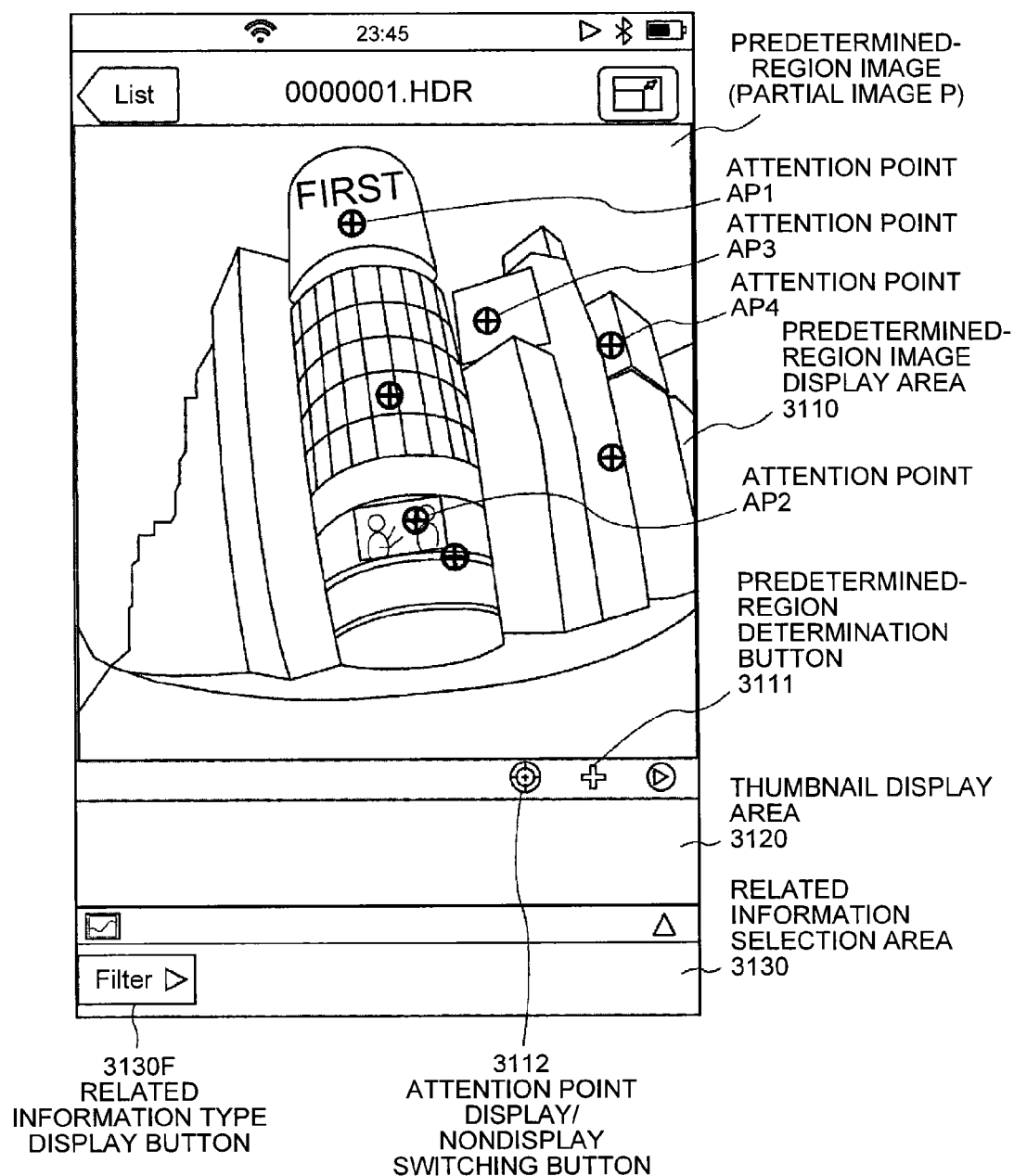
FIG. 24 is a diagram displaying a plurality of attention points.
Figure 25:
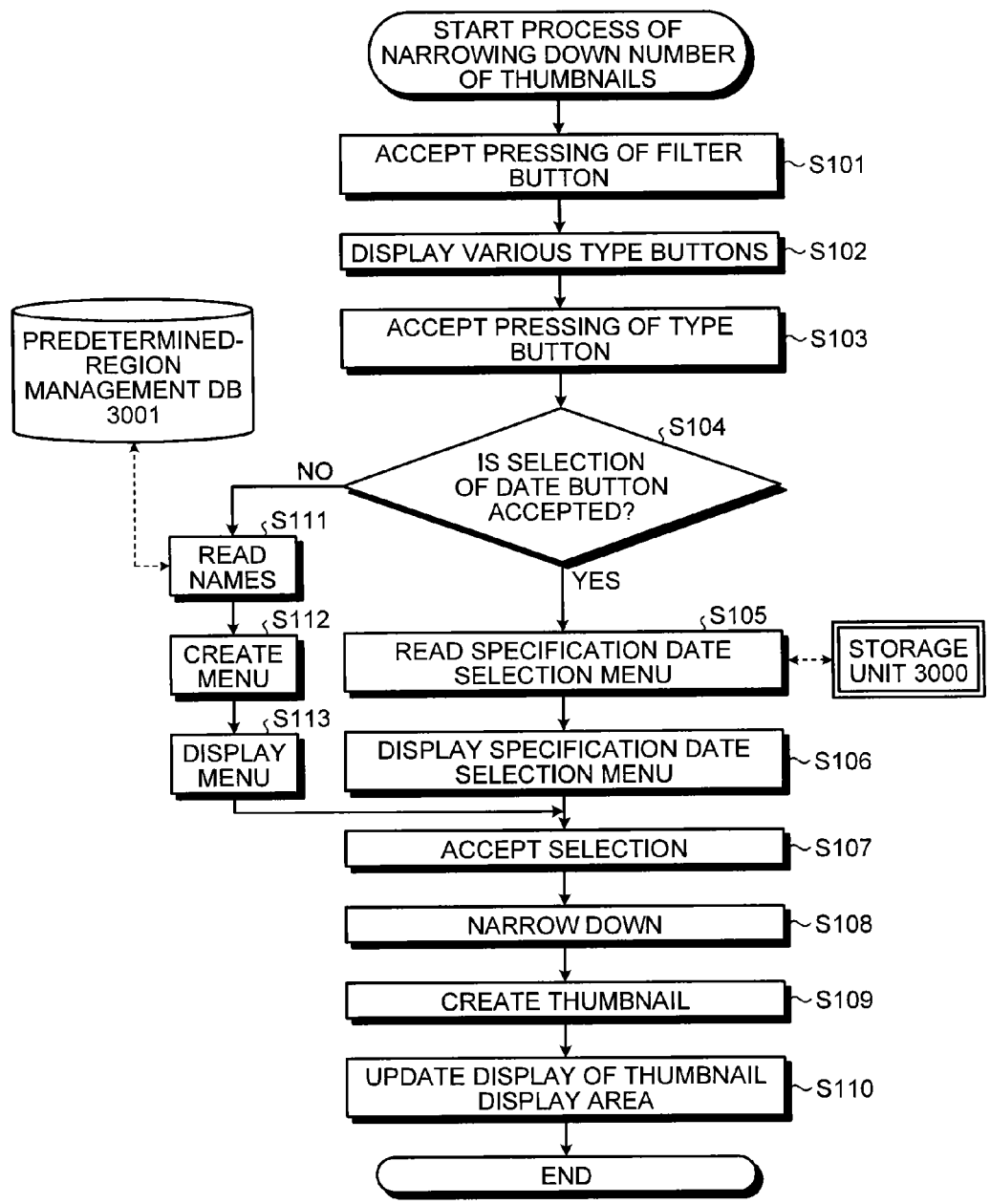
FIG. 25 is a flowchart illustrating a process of narrowing down the number of thumbnails.

However, setting multiple attention points (predetermined regions) can confuse a user who intends to browse the predetermined-region image. Therefore, using FIGS. 24 to 34, a description will be made below of a process in which the user D illustrated in FIG. 1 narrows down the multiple thumbnails to a desired thumbnail using the communication terminal 3d. FIG. 24 is a diagram displaying the multiple attention points. FIG. 25 is a flowchart illustrating the process of narrowing down the number of the thumbnails.

First, in the same manner as the users B and C did, the user D displays a predetermined-region image such as illustrated in FIG. 24 on the display 315 of the communication terminal 3d, based on the photographed image and the predetermined-region management information downloaded at Step S31. The attention points AP1, AP2, AP3, AP4, and so on are displayed in the predetermined-region image. In this state, no thumbnail is displayed in the thumbnail display area 3120.

Figure 26:
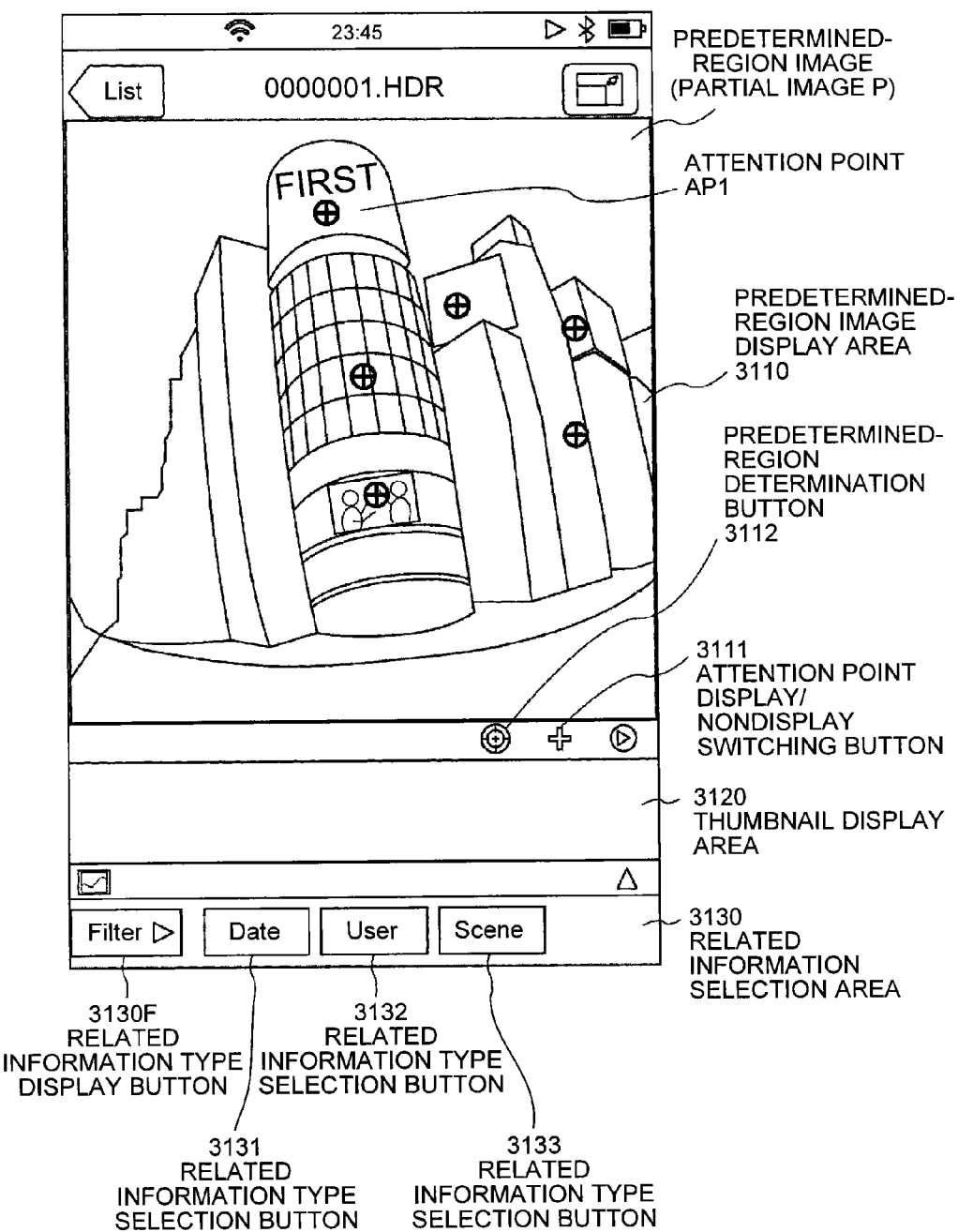
FIG. 26 is a diagram illustrating related information type selection buttons.

Here, suppose that the user D presses the related information type display button (Filter button) 3130F in FIG. 24 to narrow down the attention points (predetermined region images) to a desired type of predetermined-region image. Then, the operation input accepting unit 32 accepts the pressing (Step S101), as illustrated in FIG. 25. This causes the display control unit 34 to control the display 315 to display a related information type selection button (Date button here) 3131, a related information type selection button (User button here) 3132, and a related information type selection button (Scene button here) 3133 in the related information selection area 3130 (Step S102), as illustrated in FIG. 26. FIG. 26 is a diagram illustrating the related information type selection buttons.

Next, when the user D presses any one of the above-mentioned three buttons 3131, 3132, and 3133, the operation input accepting unit 32 accepts the selection of one of the three buttons 3131, 3132, and 3133 (Step S103). The operation input accepting unit 32 also determines whether the related information type selection button (Date button) 3131 is accepted (Step S104).

If Step S104 determines that the related information type selection button (Date button) 3131 is pressed "YES", the storage/extraction unit 39 reads the data of the specification date selection menu stored in advance in the storage unit 3000 (Step S105). Then, as illustrated in FIG. 27, the display control unit 34 controls the display 315 to display the related information selection menu (specification date selection menu here) 3141 on the predetermined-region image (Step S106). FIG. 27 is a diagram illustrating the specification date selection menu indicating specification dates of predetermined-region images, and is an example of the related information selection menu.

Next, when the user D presses a desired date, the operation input accepting unit 32 accepts the selection of the date when the predetermined-region image is specified (Step S107). Then, the storage/extraction unit 39 searches the predetermined-region management DB 3001 using the information of the date accepted at Step S107 as a search key so as to extract predetermined-region management information including the related information whose value of the specification date is the same as the accepted date, and thus narrows down the predetermined-region management information (Step S108).

Then, using the predetermined-region information of the predetermined-region management information extracted at Step S108 above, the creation unit 33 applies the method illustrated in FIGS. 7 and 8A to specify a predetermined-region image for a photographed image indicated by the image identification information of the predetermined-region management information extracted at Step S108 above, and creates a thumbnail from the predetermined-region image (Step S109). The creation unit 33 also creates thumbnails for all pieces of the predetermined-region management information that include the related information whose values of the specification dates are the same as the date accepted at Step S107 above. At this time, for identification of the created thumbnails, the creation unit 33 associates the created thumbnails with the thumbnail identification information that is already received.

Figure 28:
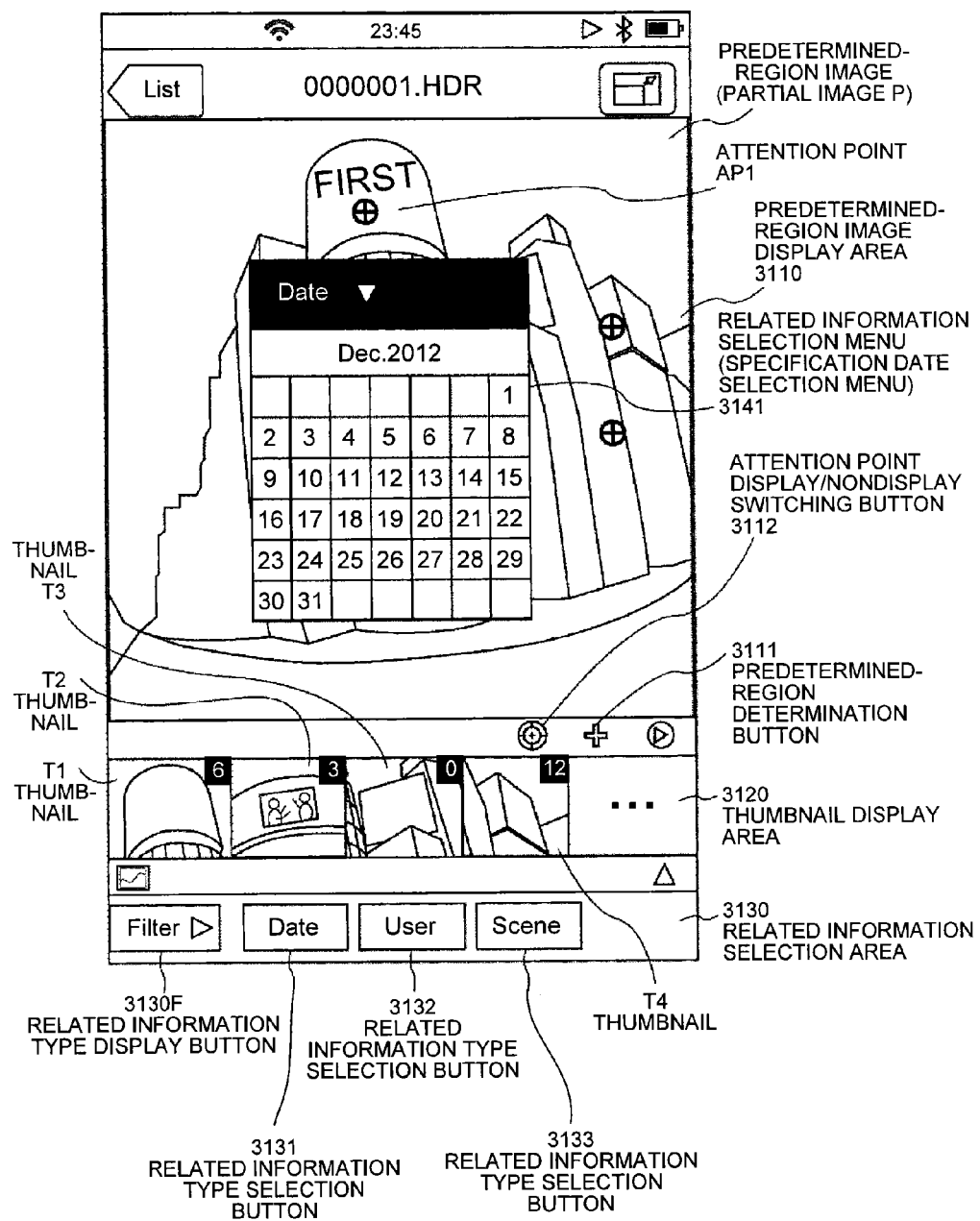
FIG. 28 is a diagram illustrating thumbnails.
Figure 29:
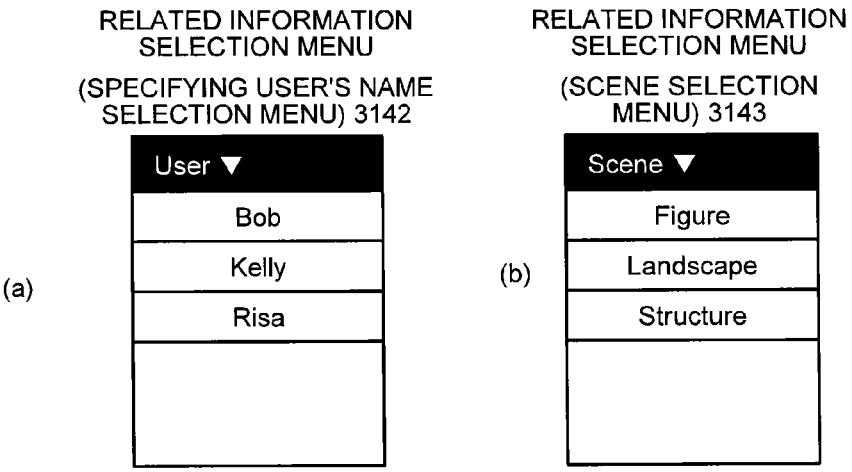
FIG. 29(a) is a diagram illustrating a creator name selection menu that is an example of the related information selection menu.
FIG. 29(b) is a diagram illustrating a scene selection menu that is an example of the related information selection menu.

Then, as illustrated in FIG. 28, the display control unit 34 controls the display 315 to display all of the thumbnails created by the creation unit 33 in the thumbnail display area 3120, and thus updates the display of the thumbnail display area 3120 (Step S110). FIG. 28 is a diagram illustrating the thumbnails.

If Step S104 does not determine that the related information type selection button (Date button) 3131 is pressed "NO", the storage/extraction unit 39 reads, from the predetermined-region management DB 3001, the related information indicating names related to a button selected out of the related information type selection button (User button) 3132 and the related information type selection button (Scene button) 3133 (Step S111). For example, if Step S103 above accepts the related information type selection button (User button) 3132, all names in the attribute (field) of specifying user's name are read. If Step S103 above accepts the related information type selection button (Scene button) 3133, all names in the attribute (field) of scene are read.

Next, based on the names read at Step S111 above, the creation unit 33 creates a related information selection menu (Step S112). For example, if Step S103 above has selected the related information type selection button (User button) 3132, the creation unit 33 creates a related information selection menu (specifying user's name selection menu) 3142 that indicates names of specifying users who specified the predetermined-region images, as illustrated in FIG. 29(a). If Step S103 above has selected the related information type selection button (Scene button) 3133, the creation unit 33 creates a related information selection menu (scene selection menu) 3143 that indicates scenes of the predetermined-region images, as illustrated in FIG. 29(b).

FIG. 29(a) is a diagram illustrating the specifying user's name selection menu indicating the names of the users specifying the predetermined-region images, and is an example of the related information selection menu. FIG. 29(b) is a diagram illustrating the scene selection menu indicating the scenes of the predetermined-region images, and is an example of the related information selection menu.

Next, the display control unit 34 controls the display 315 to display the related information selection menu created at Step S112 above (Step S113). Thereafter, the same process as that of Step S107 above is executed, and thus, description thereof will be omitted.

Figure 30:
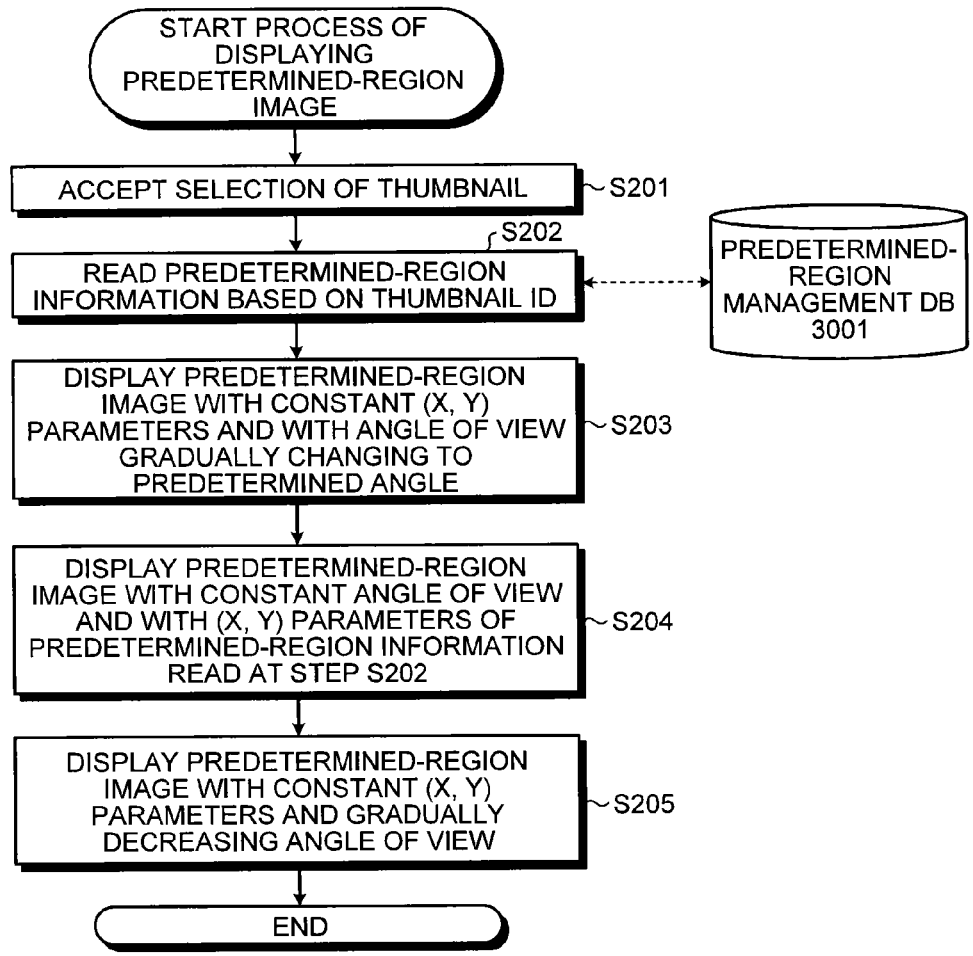
FIG. 30 is a flowchart illustrating a process of displaying a predetermined-region image.
Figure 34:
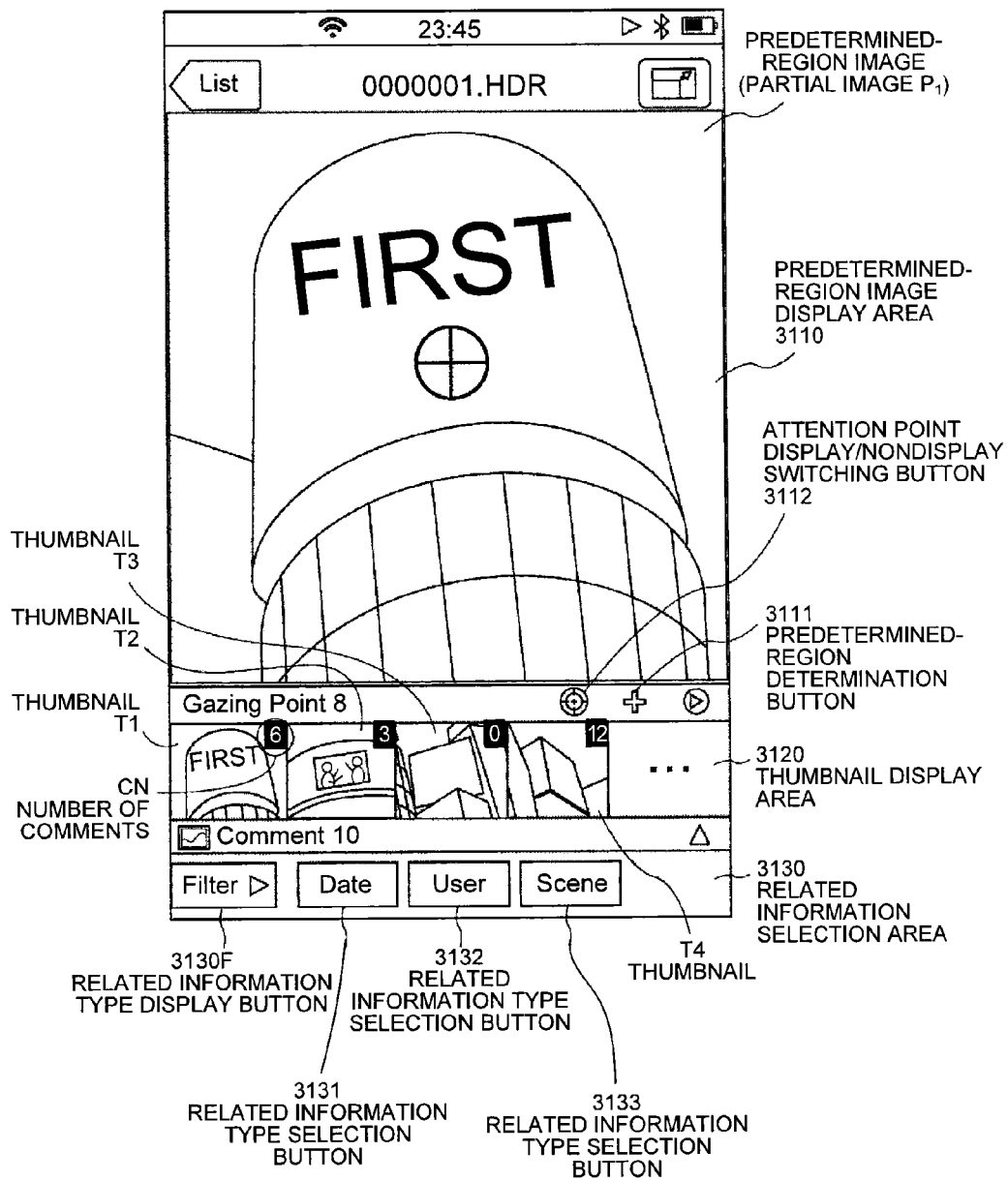
FIG. 34 is a diagram illustrating the predetermined-region image corresponding to the thumbnail.

Next, a process of displaying a predetermined-region image will be described using FIGS. 30 and 34. FIG. 30 is a flowchart illustrating the process of displaying a predetermined-region image. FIG. 34 is a diagram illustrating a predetermined-region image corresponding to a thumbnail.

First, suppose that the user D presses a desired thumbnail among the thumbnails displayed at Step S110 above. Then, the operation input accepting unit 32 accepts the selection of the thumbnail (Step S201). Then, based on the thumbnail identification information of the thumbnail accepted at Step S201 above, the storage/extraction unit 39 searches the predetermined-region management table (refer to FIG. 14) to read corresponding predetermined-region information (Step S202).

Figure 31:
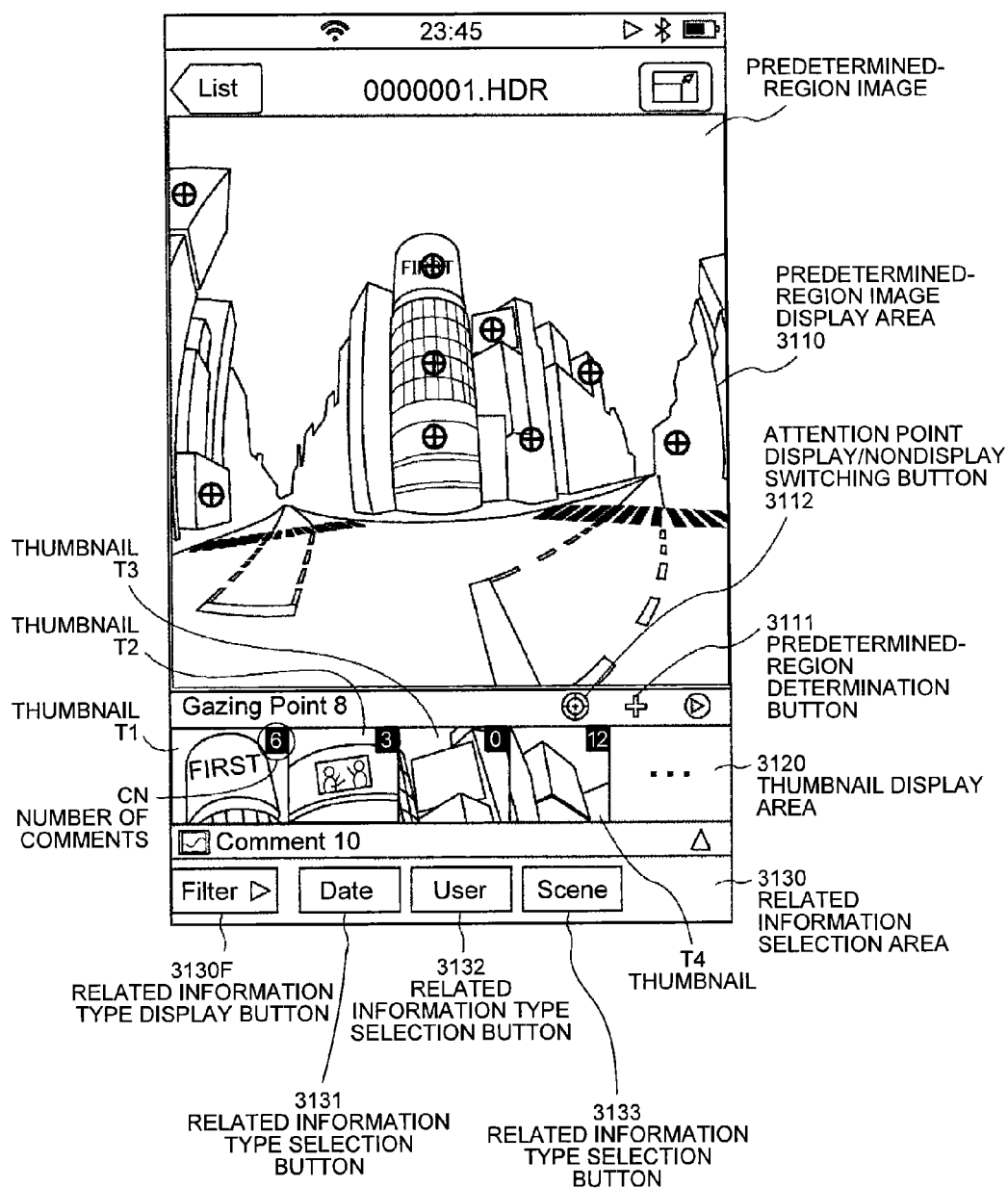
FIG. 31 is a diagram illustrating a predetermined-region image having a predetermined angle of view.

Next, as illustrated in FIG. 31, the display control unit 34 controls the display 315 to display a predetermined-region image that is obtained by keeping the (x, y) parameters of the predetermined-region information for the predetermined-region image illustrated in FIG. 28 unchanged while gradually changing the angle of view of the virtual camera IC to a predetermined angle of view (Step S203). FIG. 31 is a diagram illustrating the predetermined-region image having the predetermined angle of view. Here, the angle of view of the predetermined-region image illustrated in FIG. 31 is larger than the angle of view of the predetermined-region image illustrated in FIG. 28, and thus allows the user to view a wider range.

Then, the display control unit 34 controls the display 315 to display a predetermined-region image illustrated in FIG. 31 that is obtained by keeping the angle of view of the predetermined-region image illustrated in FIG. 31 unchanged while centering the predetermined-region image at the (x, y) parameters of the predetermined-region information read at Step S202 above (Step S204).

Figure 32:
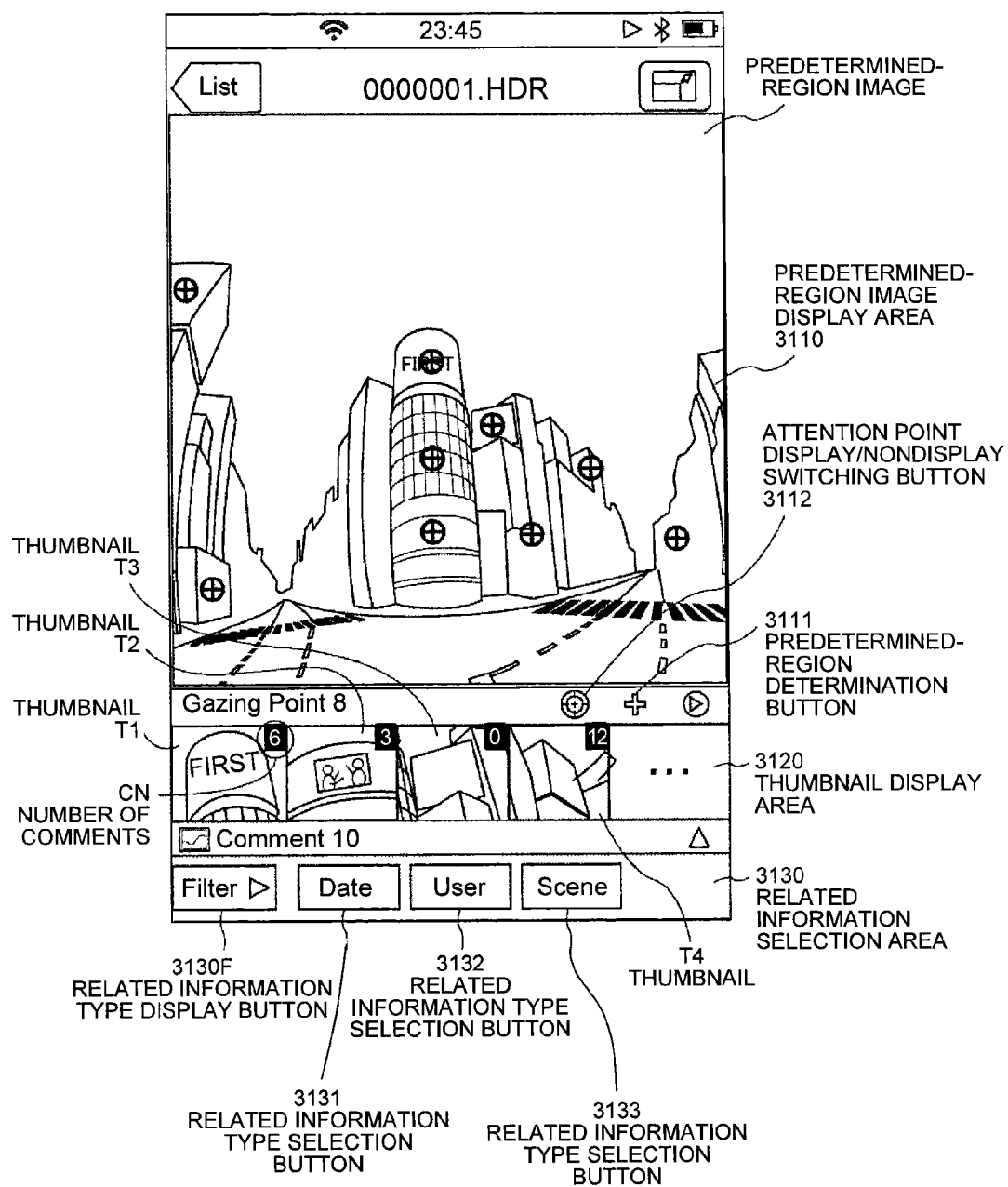
FIG. 32 is a diagram illustrating a predetermined-region image displayed before a predetermined-region image corresponding to a thumbnail is displayed.
Figure 33:
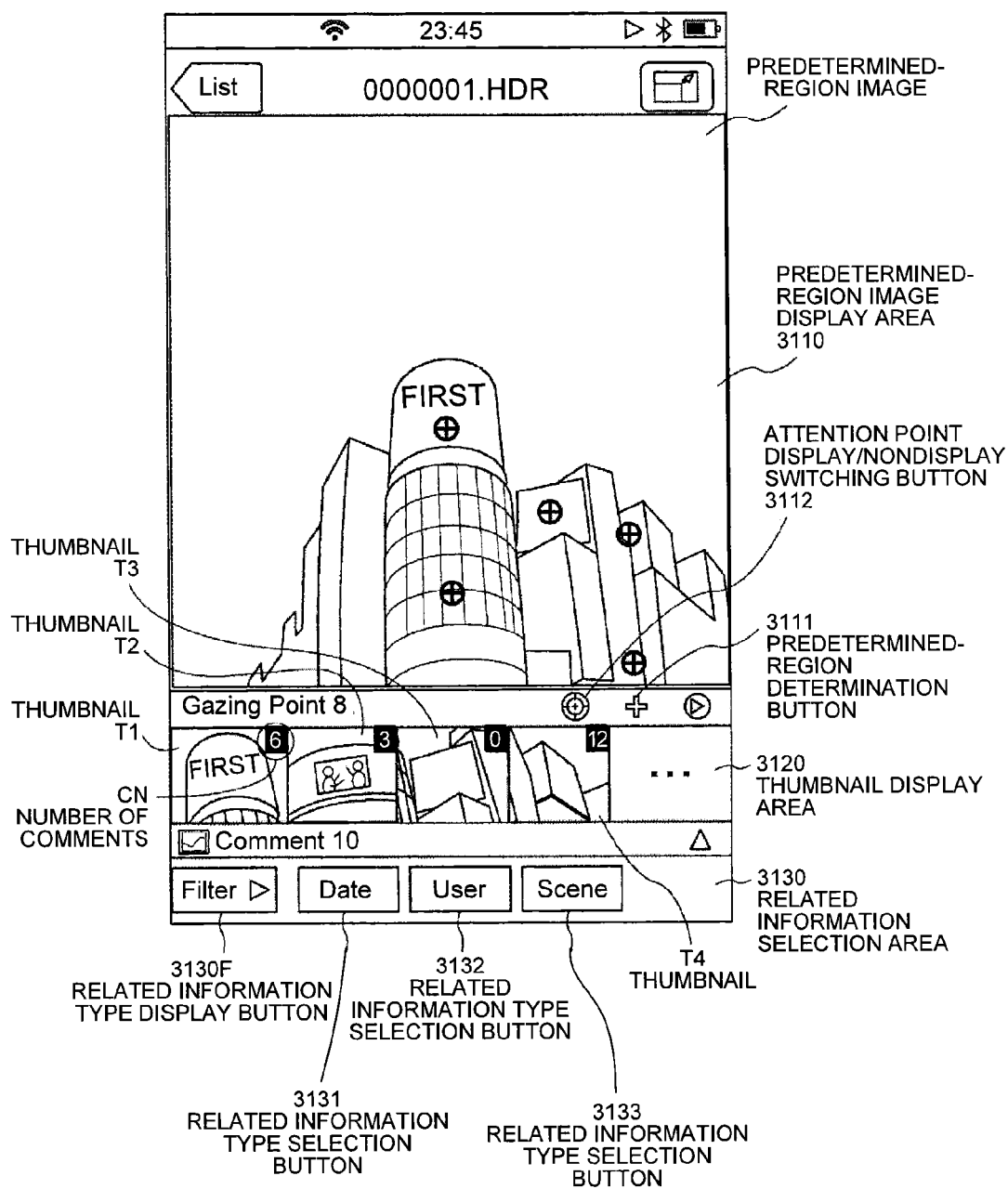
FIG. 33 is a diagram illustrating a predetermined-region image displayed before the predetermined-region image corresponding to the thumbnail is displayed.

Then, the display control unit 34 gradually reduces the angle of view of the virtual camera IC while keeping the (x, y) parameters of the predetermined-region information for the predetermined-region image illustrated in FIG. 32 unchanged so as to display a predetermined-region image such as illustrated in FIG. 33, and further reduces the angle of view to display the predetermined-region image (partial image $P_1$) such as illustrated in FIG. 34 (Step S205). FIGS. 32 and 33 are diagrams illustrating the predetermined-region images displayed before the predetermined-region image corresponding to the thumbnail is displayed. FIG. 34 is a diagram illustrating the predetermined-region image corresponding to the thumbnail.

Main Effects of Present Embodiment

As described above, in the present embodiment, the communication terminal 3 can display the thumbnails for the predetermined-region images in the panoramic image and to accept the selection of a predetermined thumbnail so as to display the predetermined-region image corresponding to the accepted thumbnail in the panoramic image. This brings about an effect that the user can easily find a desired panoramic image or a desired predetermined-region image in the panoramic image.

In addition, when there are a plurality of full spherical panoramic images (photographed images) or a plurality of predetermined-region images (attention points), the user can narrow down the thumbnails to the desired thumbnail and then specify the predetermined-region image. Therefore, the user can be less confused when browsing the predetermined-region image. This brings about an effect that the user can easily find a desired full spherical panoramic image or a desired predetermined-region image in the full spherical panoramic image.

Second Embodiment

Figure 35:
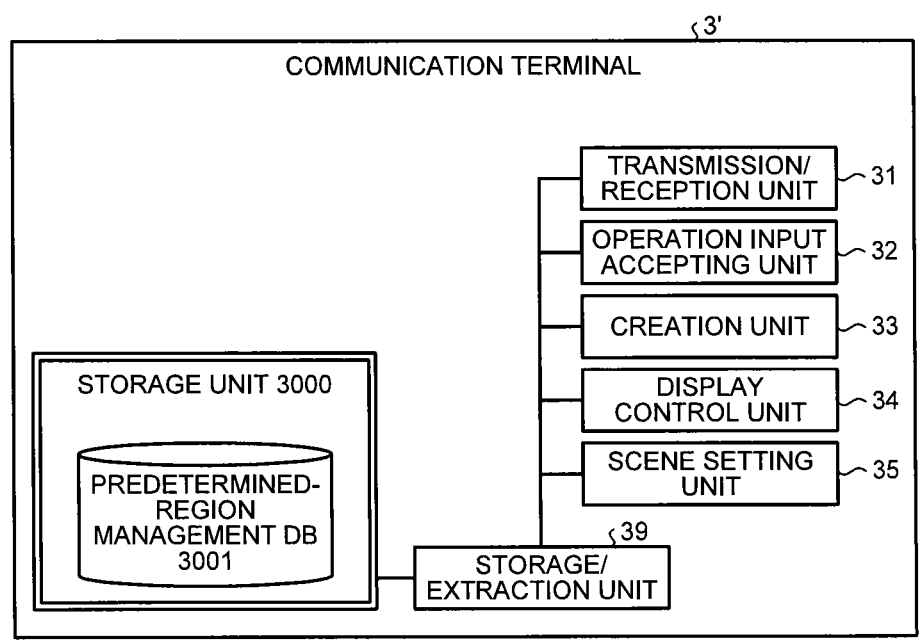
FIG. 35 is a functional block diagram of a communication terminal according to a second embodiment.

Next, a second embodiment of the present invention will be described using FIGS. 35 and 36. While the image processing system 5 sets the scene in the first embodiment described above, a communication terminal 3' sets the scene in the present embodiment.

Hardware Configurations of Embodiment

The hardware configurations of the present embodiment are the same as those of the first embodiment, and thus description thereof will be omitted.

Functional Configuration of Embodiment

Next, a functional configuration of the present embodiment will be described using FIG. 35. FIG. 35 is a functional block diagram of the communication terminal according to the present embodiment. While the image processing system 5 includes the scene setting unit 52 in the first embodiment as illustrated in FIG. 13, the present embodiment differs from the first embodiment in that the communication terminal 3' includes a scene setting unit 35 as illustrated in FIG. 35. Other functional configurations are the same as those of the first embodiment; therefore, the same functions will be given the same signs, and description thereof will be omitted.

The scene setting unit 35 of the present embodiment is a function or means implemented by operation of any of the constituent elements illustrated in FIG. 10 driven by commands from the CPU 111 according to the programs for the communication terminal 3' that are loaded from the SRAM 113 and deployed in the DRAM 114. The scene setting unit 35 sets, based on the data of the photographed image stored in the storage unit 3000 of the communication terminal 3', which scene of a figure, landscape, structure, and others is represented by the photographed image. The method for this setting is the same as that of the processing by the scene setting unit 52 in the first embodiment.

Processing and Operation of Embodiment

Next, processing and operation of the present embodiment will be described using FIGS. 20 to 22, and 36. FIG. 36 is a screen example illustrating a setting process of a predetermined region in the present embodiment.

In the first embodiment, as illustrated in FIG. 21, the communication terminal 3 does not set the scene of the predetermined-region image, but the image processing system 5 sets the scene of the predetermined-region image as illustrated at Step S46 of FIG. 20. However, in the present embodiment, the communication terminal 3' sets the scene of the predetermined-region image between Steps S41-4 and S41-5 of FIG. 21.

Figure 36:
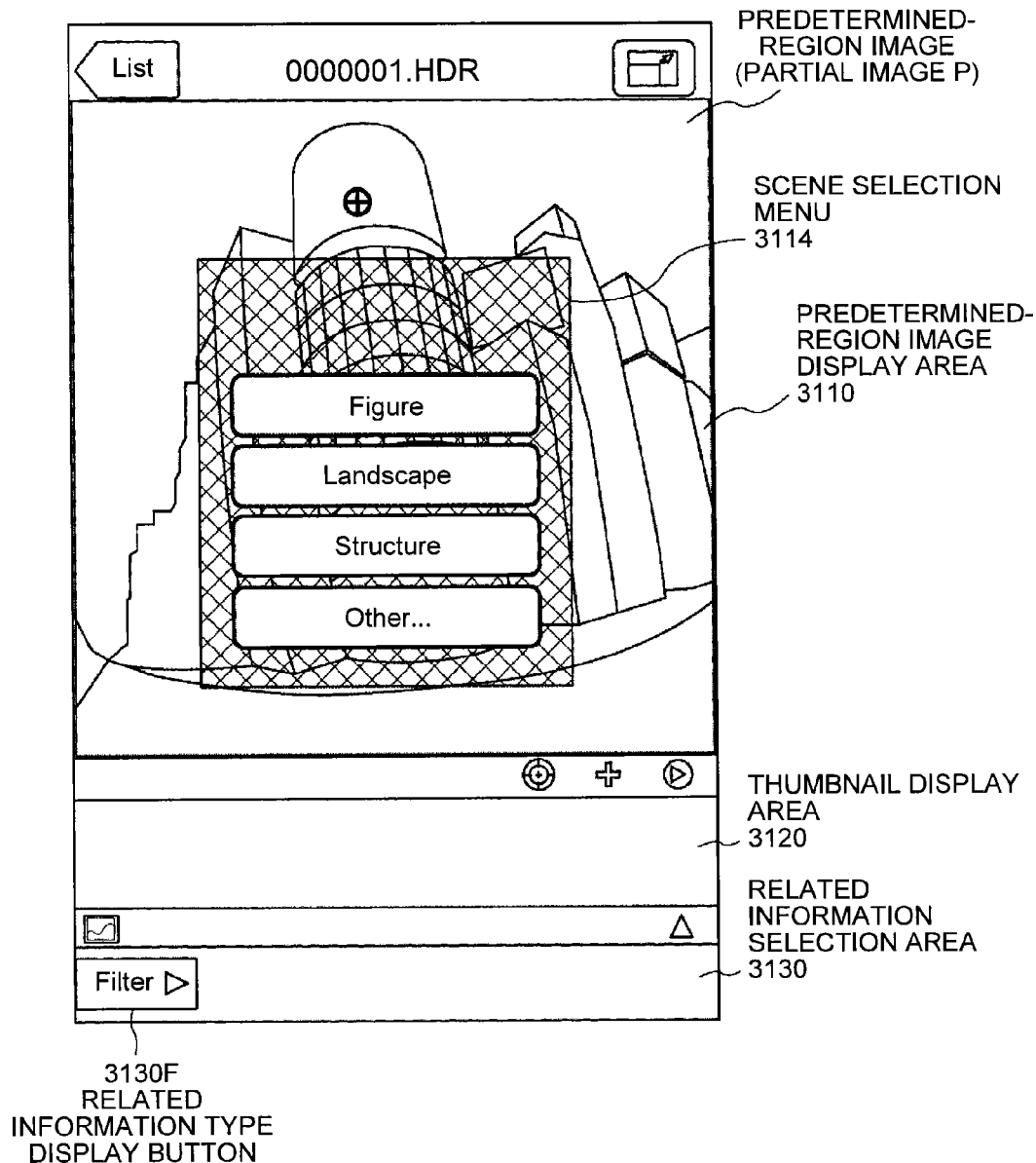
FIG. 36 is a screen example illustrating a setting process of a predetermined region in the second embodiment.

In the present embodiment, in the same manner as in the first embodiment, after the setting of the predetermined region (attention point) is accepted in FIG. 22, the display control unit 34 controls the display 315 to display a scene selection menu 3114 for accepting a selection of a scene from the user in the predetermined-region image display area 3110, as illustrated in FIG. 36. The scene selection menu 3114 displays buttons for the user to select any one of the scenes of a figure, landscape, structure, and others. The operation input accepting unit 32 recognizes that any one of the buttons is pressed, and the scene setting unit eventually sets a scene.

While the predetermined-region management information except the scene is stored in the predetermined-region management DB 3001, as illustrated at Step 41-5 of FIG. 21 in the first embodiment, the predetermined-region management information including the scene is stored in the predetermined-region management DB 3001 in the present embodiment. The predetermined-region management information including the scene is sent from the communication terminal 3' to the image management system 7, directly or via the image processing system 5, so as to be stored by the image management system 7 in the predetermined-region management DB 7002 in the same manner as at Step S48 of FIG. 20, and to be managed by the image management system 7. As a result, the predetermined-region management information including the scene is managed in the image sharing system, and thus can be acquired by other users.

Main Effect of Present Embodiment

As described above, the user can set the scene of the predetermined-region image in the present embodiment. This brings about an effect, in addition to the effects of the first embodiment, that the user can register the predetermined-region image, as a scene intended by the user, in the image sharing system.

Third Embodiment

Figure 37:
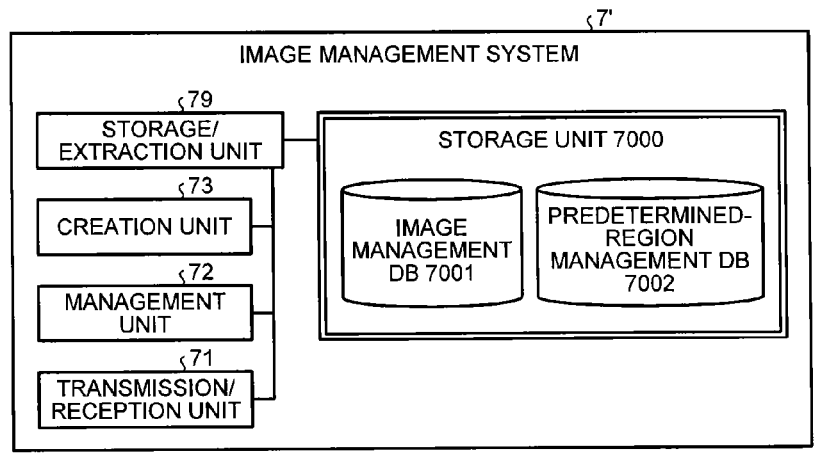
FIG. 37 is a functional block diagram of an image management system 7' according to a third embodiment.

Next, a third embodiment of the present invention will be described using FIGS. 37 and 38. Thumbnails are created in the communication terminal 3 in the first embodiment whereas, in the present embodiment, the thumbnails are created in an image management system 7', which is a feature of the present embodiment.

Hardware Configurations of Embodiment

The hardware configurations of the present embodiment are the same as those of the first embodiment, and thus description thereof will be omitted.

Functional Configuration of Embodiment

Next, a functional configuration of the present embodiment will be described using FIG. 37. FIG. 37 is a functional block diagram of the image management system 7' of the third embodiment. While the communication terminal 3 includes the creation unit 33 in the first embodiment as illustrated in FIG. 13, the present embodiment differs from the first embodiment in that the image management system 7' includes a creation unit 73 as illustrated in FIG. 37. Other functional configurations are the same as those of the first embodiment. Therefore, the same functions will be given the same signs, and description thereof will be omitted.

Configurations of Functions of Image Management System

Next, configurations of functions of the image management system 7' will be described in detail using FIG. 37. The description will be made of only the creation unit 73 that differs from the creation unit of the first embodiment.

The creation unit 73 is mainly implemented by processing of the CPU 501 illustrated in FIG. 12. Based on the predetermined-region image in the full spherical panoramic image identified by the predetermined-region management information (image identification information) read by the storage/extraction unit 39, the creation unit 73 creates a thumbnail for the predetermined-region image, and also creates the thumbnail identification information for identifying the created thumbnail.

Processing and Operation of Embodiment

Next, processing and operation of the present embodiment will be described using FIGS. 18 and 38. FIG. 38 is a sequence diagram illustrating a process of downloading a photographed image and predetermined-region management information in the third embodiment. In the present embodiment, the same process is executed as that of Steps S21 to S30 of FIG. 18 in the first embodiment; therefore, the process after this process will be described using FIG. 38.

Figure 38:
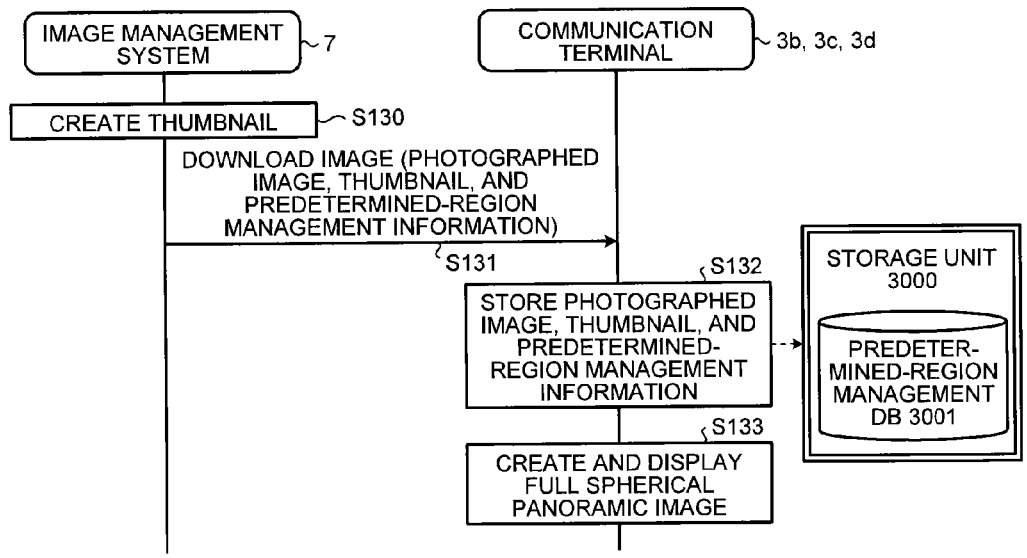
FIG. 38 is a sequence diagram illustrating a process of downloading a photographed image and predetermined-region management information in the third embodiment.

As illustrated in FIG. 38, based on the predetermined-region image in the full spherical panoramic image identified by the predetermined-region management information (image identification information) read by the storage/extraction unit 39, the creation unit 73 creates a thumbnail for the predetermined-region image, and also creates the thumbnail identification information for identifying the created thumbnail.

Then, the transmission/reception unit 71 sends the photographed image read at Step S29 illustrated in FIG. 18 and the predetermined-region management information read at Step S30 illustrated in FIG. 18 to the communication terminal 3b in the same manner as that of Step S31 illustrated in FIG. 18, and in addition, sends the thumbnail and the thumbnail identification information created at Step S130 illustrated in FIG. 38 (Step S131). As a result, the transmission/reception unit 31 of the communication terminal 3b receives the photographed image, the thumbnail, the predetermined-region management information, and the thumbnail identification information, and thus the downloading of the photographed image is terminated. Note that the thumbnail identification information created at Step S130 above is associated with the image identification information, the predetermined-region information, and the related information of the predetermined-region management information.

Then, the storage/extraction unit 39 stores the photographed image and the thumbnail downloaded at Step S131 illustrated in FIG. 38 in the storage unit 3000, and stores the predetermined-region management information downloaded at Step S131 above in the predetermined-region management DB 3001 of the storage unit 3000 (Step S132 illustrated in FIG. 38). The predetermined-region management information stored in the predetermined-region management DB 3001 constitutes a management table having the same form as that of FIG. 16.

Then, in the same manner as that of Step S33 illustrated in FIG. 18, the creation unit 33 of the communication terminal 3b creates a full spherical panoramic image such as illustrated in FIG. 6 based on the photographed image, and the display control unit 34 controls the display 315 of the communication terminal 3b to display the full spherical panoramic image (Step S133 illustrated in FIG. 38).

Main Effect of Present Embodiment

As described above, the image management system 7' can also create the thumbnail in the present embodiment. This brings about an effect, in addition to the effects of the first embodiment, that any program for creating the thumbnail need not be installed on the communication terminals.

Supplement to Embodiments

The image processing system 5 and the image management system 7 in the above-described embodiments may be built up with one computer, or may be built up with a plurality of computers arbitrarily assigned with divisions of the units (functions or means).

The recording medium such as a CD-ROM storing the programs of the above-described embodiments and the HD 504 storing the programs can be provided domestically or internationally as a program product.

Figure 39:
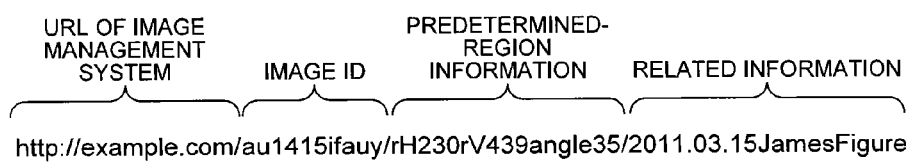
FIG. 39 is a diagram illustrating a description of link information.

While the above-described embodiments manage the predetermined-region management information in the form of the predetermined-region management table as illustrated in FIG. 16, the present invention is not limited to this, but the predetermined-region management information may be managed in the form of URLs as illustrated in FIG. 39. FIG. 39 is a diagram illustrating a description of link information.

While the first embodiment creates the thumbnail at Step S109 after narrowing down the predetermined-region management information at Step S108 in FIG. 25, the present invention is not limited to this. For example, the display control unit 34 may display all thumbnails with the predetermined-region management information not being narrowed down by the storage/extraction unit 39.

As described above, in the present invention, a communication terminal can display thumbnails for predetermined-region images in a panoramic image and accept a selection of a predetermined thumbnail so as to display the predetermined-region image corresponding to the accepted thumbnail. This brings about an effect that a user can easily find a desired panoramic image or a desired predetermined-region image in the panoramic image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication terminal comprising:
a memory configured to store therein predetermined-region information for indicating one or more predetermined regions in a pre-stored spherical panoramic image, which is configured to appear disposed on an inner surface of a virtual sphere when viewed, and thumbnail identification information for identifying one or more thumbnails for the one or more predetermined-region images indicated by the predetermined-region information, in a manner corresponding to each other, wherein the predetermined-region information is created by at least one other communication terminal which also stores the spherical panoramic image; and
circuitry configured to
control a predetermined display to display each of the one or more thumbnails corresponding to the one or more predetermined regions separate from and smaller than a display region in which the pre-stored spherical panoramic image is configured to be viewed or navigated; and
accept a selection of a predetermined thumbnail out of the displayed one or more thumbnails; wherein
the circuitry controls, based on the thumbnail identification information of the selected thumbnail, the display to display the predetermined-region image indicated by the predetermined-region information corresponding to the thumbnail identification information,
wherein the predetermined-region information is created based on inputs received at a plurality of other communication terminals which also store the spherical panoramic image and the predetermined-region information is used by the communication terminal to extract a predetermined region from the pre-stored spherical panoramic image for generation and display of image data corresponding to the extracted predetermined region without receiving separate image data for the extracted predetermined region from an external device,
wherein
the memory stores therein image identification information for identifying the spherical panoramic image and related information related to the predetermined regions, in a manner corresponding to the predetermined-region information,
the circuitry accepts a selection of a type of predetermined related information that pertains to creation of each of the predetermined-region images, which is separate from creation of the spherical panoramic image, the type of the predetermined related information is a specification date of creation of a predetermined-region image and a name of a user specifying a predetermined-region image,
the circuitry filters the predetermined-region information such that the circuitry controls the display to display only the one or more thumbnails for one or more predetermined-region images indicated by the predetermined-region information corresponding to the selected predetermined related information, in the spherical panoramic image identified by the image identification information corresponding to the selected predetermined related information;
the circuitry accepts the selection of the predetermined thumbnail out of the displayed thumbnails after the filtering of the predetermined-region information;
the circuitry controls the display to display the predetermined-region image indicated by the predetermined-region information corresponding to the selected thumbnail.

2. The communication terminal according to claim 1, wherein the specification date of the predetermined-region image is represented by a calendar.

3. A display method for displaying an image using a communication terminal comprising a memory that stores therein image identification information for identifying a pre-stored spherical panoramic image, which is configured to appear disposed on an inner surface of a virtual sphere when viewed, predetermined-region information for specifying a predetermined region in the panoramic image and related information related to the predetermined region, in a manner corresponding to each other, wherein the predetermined-region information is created by at least one other communication terminal which also stores the spherical panoramic image, the display method comprising, by the communication terminal:

accepting a selection of predetermined related information;

searching the memory based on the predetermined related information accepted at the accepting so as to extract the image identification information and the predetermined-region information corresponding to the predetermined related information; and controlling a predetermined display to display each of one or more thumbnails for predetermined-region images specified in the extracted predetermined-region separately from and smaller than a display region in which the pre-stored spherical panoramic image is configured to be viewed or navigated; wherein the accepting includes accepting a selection of a predetermined thumbnail out of the displayed thumbnails; and the controlling includes controlling the display to display the predetermined-region image indicated by the predetermined-region information corresponding to the selected thumbnail, wherein the predetermined-region information is created based on inputs received at a plurality of other communication terminals which also store the spherical panoramic image and the predetermined-region information is used by the communication terminal to extract a predetermined region from the pre-stored spherical panoramic image for generation and display of image data corresponding to the extracted predetermined region without receiving separate image data for the extracted predetermined region from an external device, wherein the memory stores therein image identification information for identifying the spherical panoramic image and related information related to the predetermined regions, in a manner corresponding to the predetermined-region information, and the method further includes accepting a selection of a type of predetermined related information that pertains to creation of each of the predetermined-region images, which is separate from creation of the spherical panoramic image, the type of the predetermined related information is a specification date of creation of a predetermined-region image and a name of a user specifying a predetermined-region image, filtering the predetermined-region information by controlling the display to display only the one or more thumbnails for one or more predetermined-region images indicated by the predetermined-region information corresponding to the selected predetermined related information, in the spherical panoramic image identified by the image identification information corresponding to the selected predetermined related information, accepting the selection of the predetermined thumbnail out of the displayed thumbnails after filtering of the predetermined-region information, and controlling the display to display the predetermined-region image indicated by the predetermined-region information corresponding to the selected thumbnail.

4. A computer program product comprising a non-transitory computer-readable medium containing a computer program that causes a computer to function as a communication terminal comprising a memory that stores therein image identification information for identifying a pre-stored spherical panoramic image, which is configured to appear disposed on an inner surface of a virtual sphere when viewed, predetermined-region information for specifying a predetermined region in the panoramic image, and related information related to the predetermined region, in a manner corresponding to each other, and to perform a method comprising:

accepting a selection of predetermined related information;

searching the memory based on the predetermined related information accepted at the accepting so as to extract the image identification information and the predetermined-region information corresponding to the predetermined related information, wherein the predetermined-region information is created by at least one other communication terminal which also stores the panoramic image; and controlling a predetermined display to display each of one or more thumbnails for predetermined-region images specified in the extracted predetermined-region separately from and smaller than a display region in which the pre-stored spherical panoramic image is configured to be viewed or navigated; wherein the accepting includes accepting a selection of a predetermined thumbnail out of the displayed thumbnails; and the controlling includes controlling the display to display the predetermined-region image indicated by the predetermined-region information corresponding to the selected thumbnail, wherein the predetermined-region information is created based on inputs received at a plurality of other communication terminals which also store the spherical panoramic image and the predetermined-region information is used by the communication terminal to extract a predetermined region from the pre-stored spherical panoramic image for generation and display of image data corresponding to the extracted predetermined region without receiving separate image data for the extracted predetermined region from an external device, wherein the memory stores therein image identification information for identifying the spherical panoramic image and related information related to the predetermined regions, in a manner corresponding to the predetermined-region information, and the method further includes accepting a selection of a type of predetermined related information that pertains to creation of each of the predetermined-region images, which is separate from creation of the spherical panoramic image, the type of the predetermined related information is a specification date of creation of a predetermined-region image and a name of a user specifying a predetermined-region image, filtering the predetermined-region information by controlling the display to display only the one or more thumbnails for one or more predetermined-region images indicated by the predetermined-region information corresponding to the selected predetermined related information, in the spherical panoramic image identified by the image identification information corresponding to the selected predetermined related information, accepting the selection of the predetermined thumbnail out of the displayed thumbnails after the filtering of the predetermined-region information, and controlling the display to display the predetermined-region image indicated by the predetermined-region information corresponding to the selected thumbnail.

5. The communication terminal according to claim 1, wherein the circuitry is configured to receive an input of a selection of a predetermined region in the spherical panoramic image to create new predetermined-region information which is shared with at least one other communication terminal which receives the spherical panoramic image.

6. The communication terminal according to claim 1, wherein predetermined-region information includes at least coordinate information and angle of view of information of the predetermined region in the spherical panoramic image.

7. The communication terminal according to claim 6, wherein the coordinate information is spherical coordinate information which identifies a center point of the predetermined region and the angle of view information defines the width of the region in the spherical panoramic image.

8. The communication terminal according to claim 1, wherein after the circuitry accepts a selection of a predetermined thumbnail when another predetermined-region image is previously displayed from a same spherical panoramic image corresponding to the displayed thumbnail, the circuitry controls the display to display the predetermined-region image indicated by the selected thumbnail by first gradually changing an angle of view of the previously displayed predetermined-region image while maintaining coordinates corresponding to a center point of the previously displayed predetermined-region image, then changing coordinates of a center point to correspond to the predetermined-region image indicated by the selected thumbnail, and then gradually decreasing an angle of view to correspond to the predetermined-region image indicated by the selected thumbnail.

* * * * *